(12) United States Patent
Ivanov et al.

(10) Patent No.: US 8,019,860 B2
(45) Date of Patent: Sep. 13, 2011

(54) SERVICE ACCOUNTING METHOD AND APPARATUS FOR COMPOSITE SERVICE

(75) Inventors: Radoslav Tr. Ivanov, Sofia (BG); Krasimir Semerdzhiev, Sofia (BG); Anton Georgiev, Montana (BG); Maria Jurova, Sofia (BG); Diyan Yordanov, Varna (BG)

(73) Assignee: SAP AG, Walldorf (DE)

( * ) Notice: Subject to any disclaimer, the term of this patent is extended or adjusted under 35 U.S.C. 154(b) by 291 days.

(21) Appl. No.: 12/341,792

(22) Filed: Dec. 22, 2008

(65) Prior Publication Data

US 2010/0157822 A1 Jun. 24, 2010

(51) Int. Cl.
*G06F 15/173* (2006.01)
(52) U.S. Cl. ...................................................... 709/224
(58) Field of Classification Search .................. 709/223, 709/224
See application file for complete search history.

(56) References Cited

U.S. PATENT DOCUMENTS

| | | | |
|---|---|---|---|
| 7,526,452 B2* | 4/2009 | Agarwal et al. | 705/52 |
| 7,664,711 B2* | 2/2010 | Agarwal et al. | 705/412 |
| 7,672,882 B2* | 3/2010 | Agarwal et al. | 705/34 |
| 7,765,293 B2* | 7/2010 | Adams et al. | 709/224 |
| 2004/0117224 A1* | 6/2004 | Agarwal et al. | 705/7 |
| 2004/0117311 A1* | 6/2004 | Agarwal et al. | 705/52 |
| 2004/0194066 A1* | 9/2004 | Frey et al. | 717/127 |
| 2008/0133764 A1* | 6/2008 | Agarwal et al. | 709/229 |
| 2008/0235119 A1* | 9/2008 | Agarwal et al. | 705/34 |
| 2008/0275985 A1* | 11/2008 | Kundu | 709/224 |
| 2010/0064039 A9* | 3/2010 | Ginter et al. | 709/224 |
| 2010/0083145 A1* | 4/2010 | Schang et al. | 715/760 |
| 2010/0125477 A1* | 5/2010 | Mousseau et al. | 705/7 |
| 2010/0125665 A1* | 5/2010 | Simpson et al. | 709/224 |
| 2010/0157822 A1* | 6/2010 | Ivanov et al. | 370/252 |

* cited by examiner

*Primary Examiner* — J Bret Dennison
(74) *Attorney, Agent, or Firm* — Schwegman, Lundberg & Woessner, P.A.

(57) ABSTRACT

A system for an accounting infrastructure, including monitoring and reporting, for individual services within a composite service. An accounting engine integrates with the composite service to monitor components and parameters of at least one service in the composite service, to provide reporting on the measurements and statistics associated therewith over time. The accounting engine aggregates data for components and services. One example provides the accounting infrastructure as an object-oriented program model, instantiating statistics as objects. The reporting distinguishes each statistic allowing analysis and optimization of processes and services.

17 Claims, 16 Drawing Sheets

| OPERATION | ALLOCATED MEM BYTES | CPU TIME (s) | ELAPSED TIME (s) |
|---|---|---|---|
| APPLICATION A | 7,599,752 | 23,412 | 1,223,412 |
| COMPONENT B | 76,744 | 3,505 | 1,223 |
| APPLICATION C | 76,744 | 2,598 | 412 |

FIG. 9

| COMPONENT | CPU | ALLOC. MEM. | TIME | UPDATED |
|---|---|---|---|---|
| basicadmin | 796876 | 43571857 | 927 | 512 |
| ConfigurationManager | 29906251 | 6589256 | 132568 | 6532 |
| deploy | 73812501 | 7758965 | 1564859 | 7589 |
| developmentserver | 2046876 | 4528965 | 5263 | 253 |
| Library_container | 1828123 | 52635 | 555214 | 172 |
| NullClassloaderClassComponent | 14356892 | 2225212 | 96532 | 896 |

FIG. 10

API FOR USER ACCOUNTING INFRASTRUCTURE

```xml
<statistic AllocatedMemory="13060384" Cpu="437500" Time="3641" dcName="tc-bl~deploy_controller" tagName="Bulk deployment sap.com_web_N_app_0_3">
- <statistic AllocatedMemory="10755688" Cpu="406250" Time="3516" dcName="tc-bl~deploy_controller" tagName="Perform delivery sap.com_web_N_app_0_3">
- <statistic AllocatedMemory="10751424" Cpu="406250" Time="3516" dcName="tc-bl~deploy_controller" tagName="Application Deployer sap.com_web_N_app_0_3">
- <statistic AllocatedMemory="10734264" Cpu="406250" Time="3516" dcName="deploy" tagName="DeployService">
 - <statistic AllocatedMemory="10724712" Cpu="406250" Time="3516" dcName="deploy" tagName="Deploy">
   <statistic AllocatedMemory="941968" Cpu="46875" Time="344" dcName="deploy" tagName="getDescriptor">
     <statistic AllocatedMemory="1504" Cpu="0" Time="0" dcName="deploy" tagName="getDescriptor" />
   </statistic>
   <statistic AllocatedMemory="2048" Cpu="0" Time="0" dcName="ConfigurationManager" tagName="getHandler" />
   <statistic AllocatedMemory="1504" Cpu="0" Time="0" dcName="deploy" tagName="getDescriptor" />
   <statistic AllocatedMemory="1504" Cpu="0" Time="0" dcName="deploy" tagName="getDescriptor" />
   <statistic AllocatedMemory="1504" Cpu="0" Time="0" dcName="deploy" tagName="getDescriptor" />
   <statistic AllocatedMemory="30888" Cpu="15625" Time="15" dcName="deploy" tagName="preprocess">
     <statistic AllocatedMemory="1504" Cpu="0" Time="0" dcName="deploy" tagName="getDescriptor" />
     <statistic AllocatedMemory="1504" Cpu="0" Time="0" dcName="deploy" tagName="getDescriptor" />
   </statistic>
   <statistic AllocatedMemory="3391632" Cpu="140625" Time="1625" dcName="deploy" tagName="preprocess">
   <statistic AllocatedMemory="3387648" Cpu="140625" Time="1625" dcName="tc~je~jiinee-lib" tagName="jlin validate:sap.com/web_N_app_0_3" />
   <statistic AllocatedMemory="15904" Cpu="0" Time="0" dcName="library_container" tagName="deploy" />
   <statistic AllocatedMemory="1265592" Cpu="0" Time="0" dcName="tc~je~webservices~srv" tagName="deploy" />
   <statistic AllocatedMemory="2707304" Cpu="78125" Time="1031" dcName="servlet_jsp" tagName="deploy" />
   <statistic AllocatedMemory="99400" Cpu="0" Time="0" dcName="developmentserver" tagName="deploy" />
   <statistic AllocatedMemory="2392" Cpu="0" Time="0" dcName="servlet_jsp" tagName="prepareDeploy" />
   <statistic AllocatedMemory="2416" Cpu="0" Time="0" dcName="servlet_jsp" tagName="applicationStatusChanged" />
   <statistic AllocatedMemory="1043064" Cpu="62500" Time="219" dcName="ConfigurationManager" tagName="commitHandler" />
   <statistic AllocatedMemory="12856" Cpu="15625" Time="16" dcName="basicadmin" tagName="NullClassloaderClassComponent" tagName="clear" />
   <statistic AllocatedMemory="96304" Cpu="0" Time="0" dcName="basicadmin" tagName="Register application MBean:sap.com/web_N_app_0_3" />
   <statistic AllocatedMemory="147304" Cpu="15625" Time="15" dcName="servlet_jsp" tagName="commitDeploy" />
   <statistic AllocatedMemory="1535" Cpu="0" Time="0" dcName="deploy" tagName="Cluster Communication Duration" />
   <statistic AllocatedMemory="2048" Cpu="0" Time="0" dcName="ConfigurationManager" tagName="getHandler" />
   <statistic AllocatedMemory="65560" Cpu="0" Time="0" dcName="servlet_jsp" tagName="downloadApplicationFiles" />
   <statistic AllocatedMemory="1856" Cpu="0" Time="0" dcName="ConfigurationManager" tagName="rollbackHandler" />
   <statistic AllocatedMemory="1536" Cpu="0" Time="0" dcName="deploy" tagName="Cluster Communication Duration" />
  </statistic>
 </statistic>
</statistic>
</statistic>
```

FIG. 11

SERVICE ACCOUNTING METHOD AND APPARATUS FOR COMPOSITE SERVICE

TECHNICAL FIELD

Example embodiments relate to the field of electronic data processing and specifically to accounting and analysis of services within a composite service structure.

BACKGROUND

Increasingly, Information Technology (IT) needs integration of processes and systems into end-to-end processes which streamline execution of composite service, automate workflows and reduce operational costs. Such integration is essential in providing access to accurate data as well as to improving inter-related and composite processes and systems. As the number of processes and systems grows, the links between them begin to create complexity in the landscape, driving up operational costs and decreasing the stability of the entire IT environment.

As integration of software products and electronic data processing processes increase, it becomes desirable to evaluate individual services, software modules or functions to determine not only their individual contribution, but their impact as part of a composite structure.

BRIEF DESCRIPTION OF DRAWINGS

FIGS. 9 and 10 illustrate report formats generated by an accounting infrastructure, according to an example embodiment.

FIG. 11 illustrates reporting in an accounting infrastructure for composite service, according to an example embodiment.

DETAILED DESCRIPTION

Figure 1:
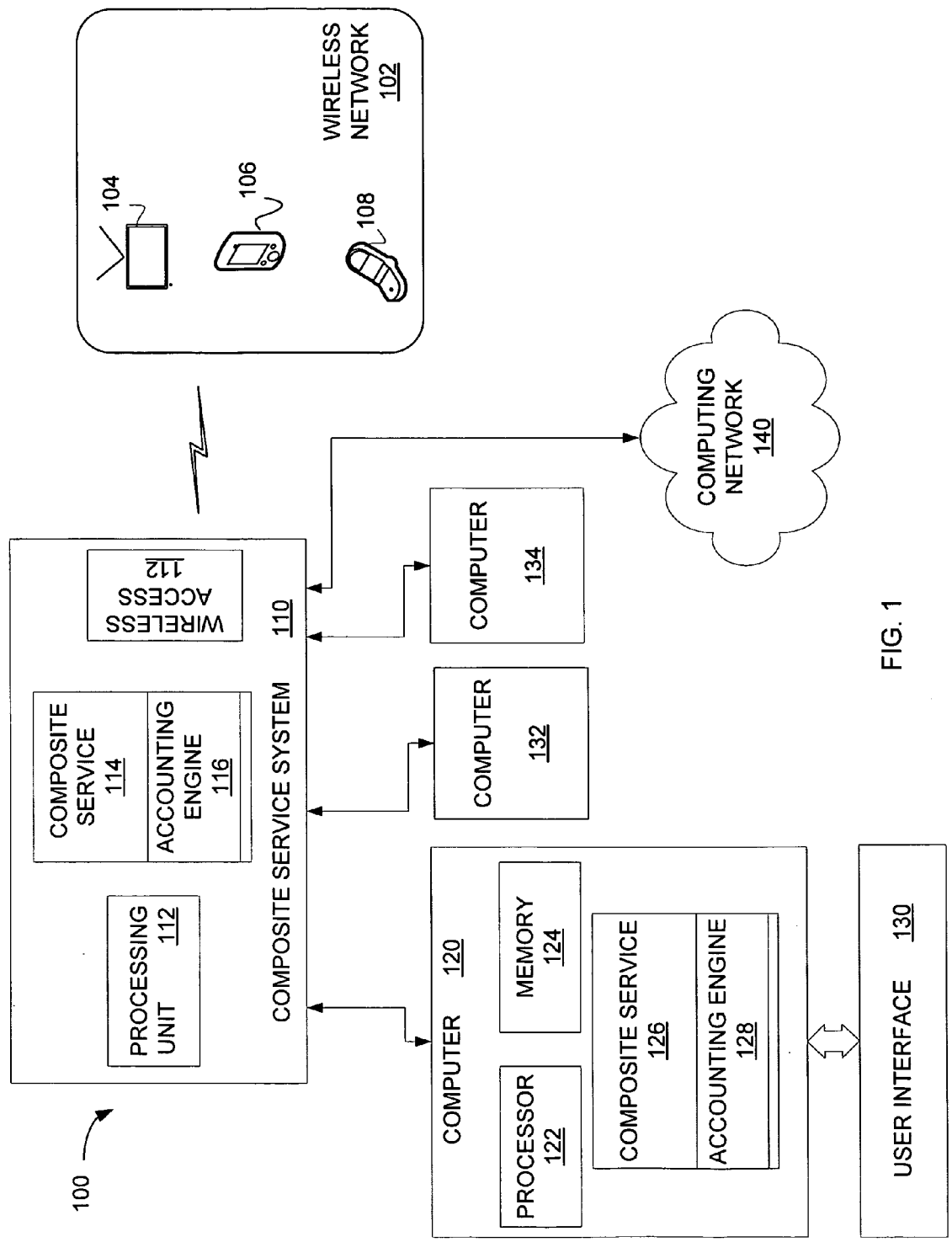
FIG. 1 is a diagram of a distributed network system supporting composite service, according to an example embodiment.

An accounting infrastructure implemented in coordination with a composite service tracks operation of individual services and components within the composite service. A composite service is a service that reuses, integrates, and orchestrates services to support business processes or specific user experiences. A business process is a set of logically related activities performed within or across an organization to fulfill a defined business objective.

Enterprise services, or services as used herein, enable business processes by encapsulating functionality and expositing it as a reusable service that may be combined with other services. Services may be assembled together to compose new applications or business processes. Services may be implemented as web services, meaning that their interfaces are defined using Internet protocols.

Composite services may include software applications used to implement individual services within the composite services. An individual service within a composite service may be a composite service itself, having multiple individual services contained within it. Composite services may be implemented in a service-oriented architecture. Services used within or by a composite service may be provided by one or more service providers. A composite application may combine services from several service providers To create a composite service, a developer looks at available services and combines them, frequently using models more model development techniques to create new composite services. A composite service may also be referred to as a composite application. A composite service allows a developer to further automate multiple services to meet new or modified business requirements. Traditional enterprise services offered user interfaces, configuration through templates, settings, and programming Application Programming Interfaces (APIs) to implement and extend functionality of a business process. In a Service-Oriented Architecture (SOA) using an object-oriented programming technique, business objects used by one service provider are exposed through services so they can be recombined in a composite service to meet new requirements. SOA is a style of software architecture that uses services as the fundamental building blocks. As a composite service includes multiple individual services, a developer may desire insight into the operation and behavior of individual services.

Each service includes at least one component, which is typically made up of software code. In one embodiment, a component is a stateful server-side object that handles client events and input data, and renders itself according to its state, and may have a certain lifecycle. A component may be embedded into another component, and may contain other components, or may be standalone. Each component consumes resource in a system, such as processing power, processing time, memory allocation, time delay in processing, etc. For example, an ecommerce service may be included in a composite service. The ecommerce service includes multiple components, including a first component to provide the user interface to a user, a second component to enable product search, a third component to enable a selection process, a fourth component to enable payment and money transfer, and other components.

When a component of a service is launched, the processing may be tracked A thread refers to the execution tracking of an operation or function and is a single sequential flow of control within a program. A thread is similar to a sequential software program. A single thread has a beginning, a sequence, and an end. At any given time during the runtime of the thread, there is a single point of execution, or execution point. While a thread is not a program and cannot run on its own, a thread does run within a program. A developer may desire insight into the operation of a component for a single thread of execution, to evaluate resource consumption at and between multiple points in the thread. A component may be built according to a programming model, such as in a Java® programming model by Sun Microsystems, Santa Clara, Calif., as an application or kernel component. Note, a composite service may perform multiple operations concurrently, wherein each execution thread typically has a priority and is executed according to that priority. As discussed hereinabove, a thread refers to the execution tracking of an operation or function.

An accounting infrastructure provides insight into such component operation by monitoring resource consumption at various points in the execution thread. Accounting infrastructure information, or accounting information, may be used by design and modeling tools for creating, implementing, evaluating, and modifying a composite service. Further, accounting information identifies resource consumption for one or multiple components within a composite service.

In one embodiment, an accounting infrastructure includes a monitoring function to measure consumption of at least one resource. Consumption of a resource is measured by evaluation of at least one parameter of operation of a component. For example, to measure consumption of a resource of memory allocation, a measured parameter would be the amount of memory used. In one example, an accounting infrastructure measures consumption of memory allocation by measuring the amount of memory allocated by a component at different point in execution thread for the component. The monitoring function starts measurement of a component parameter resource at a first point of an execution thread for the component. An accounting infrastructure according to one example embodiment uses the multiple measurements to provide a report of statistics for consumption of the resource by the component. The statistics may include performance over time, and may consider the impact of the component on other components within a service or on other services, such as where the memory consumption of a first component impacts the available memory for another component. In another example, for a resource of processing time, a first components processing time may impact a next sequential component. An accounting infrastructure of one embodiment monitors components and families of components, and is able to isolate performance of individual components. Measurements of a family of components, or related components, are available individually and also as an aggregation into one statistic.

The following description contains specific details of exemplary embodiments for illustrative purposes. The specific details are not intended to limit the scope of the embodiments and to be exhaustive regarding possible embodiments. To provide insight into operation of a composite service, such as in an enterprise system having distributed computing capacity, an accounting infrastructure monitors specific components, and thereby the various functions these components realize, for an individual service within the composite service.

In one embodiment, an accounting infrastructure is implemented by an accounting engine which monitors parameters of at least one component. Where the at least one component includes other components, the included components are considered children of that component, and that component is considered a parent. The parent and children form a family of components.

In an example embodiment, the accounting infrastructure employs object-oriented programming to build statistics objects for each measured parameter of a component or family of components. During execution of a component, statistics objects are instantiated for measured parameters. Accounting infrastructure reporting presents statistics objects in a tree format, allowing easy recognition of components and functions for optimization. Poor performing components, functions, processes and services may be identified in order to initiate trouble-shooting and potentially introduce modifications to the associated design. A statistics object has a corresponding class, wherein in one embodiment, a reporting unit generates a report including an aggregation of statistics objects for a given class.

The examples provided herein are applicable to a system having composite service, and are not limited to systems employing a SOA or using object-oriented programming. In one example, an enterprise system for a business process has distributed network capabilities, where information and services are provided to multiple users. A network or enterprise system is accessed by multiple users; the data and information used and stored in the network changes dynamically. A developer may build a composite service within an enterprise system, wherein the composite service is integrated through a central network.

A service may be provided as a modular unit of a software application that is stored in memory and executed by a computer system, for example, a server or a Personal Computer (PC). A service within a composite service may be easily accessible, for example through the Internet, or may have controlled access, such as for example a corporate internal system which controls access to employees. A service may be a web service accessed through the Internet. In one example, data is exchanged between one or more web services using extensible Markup Language (XML) and other internet based protocols. Composing web services to give a composite web service is a powerful way to create new applications and build a complete process. In one example, a web service is an ecommerce service.

A variety of different services may be integrated into a composite service. Each service may include one or more components, and different services may share a component. Execution of the composite service integrates the individual services contained therein. For example, in an ecommerce service, an online purchase of a specific product may be performed by multiple components, including maintaining a shopping cart for selected items, providing a comparison tool to track searching and compare products, offering a payment system for executing the transaction and providing a shipping service to initiate deliver of the purchased product. In this example is it desired to evaluate the individual components and the combinations of components within the ecommerce service of the composite service. Each component implements at least one operation or function, and may include multiple other operations or functions. An operation or a function may be implemented as a software program, module or routine. Returning to the ecommerce example, components implementing an operation to purchase or buy a shirt includes other operations as children components. Children components include searching the catalog, receiving selection of an item, soliciting a payment method, soliciting payment information and transferring funds.

Operations implemented by components have measureable parameters, wherein it may be desirable to calculate and maintain statistics for these parameters. Monitoring by an accounting infrastructure measures parameters at multiple points in an execution thread. Continuing with the ecommerce example, a parameter may measure the time taken to process payment for a shirt order. By tracking parameter measurements over a variety of operations within a component and collecting data over time, operation of a service is analyzed. Interpretation and explanation of the data provides statistical information and understanding of the data. Statistical information allows prediction for future operations and allows optimization and troubleshooting.

Statistics are variables depending on known parameters, and therefore, a service developer or a service user selects which parameters to measure and monitor based on the desired statistical information. In one example embodiment, monitoring in an accounting infrastructure provides statistics as multiple parameter measurements. As an example, during execution of a component, a start measurement may be made at a first execution point, and an end measurement may be made at a second execution point. The statistics include each measurement, along with an indication of a corresponding execution point in the component. In some cases, tracking of parameter values provides desired information to a user. In other cases, statistical analysis identifies an unknown relationship or problem. In still other situations, statistical analysis allows optimization of a process. Statistics may also be provided as a calculation based on the measured parameter values.

In one example, an accounting infrastructure measures elapsed time for an operation to complete, such as time for searching a catalog as in an ecommerce example or searching for a vocabulary word in an online dictionary service, or searching for an item associated with a matter in an internal corporate matter management service. In one example embodiment, an accounting infrastructure compiles statistics for the component and has reporting function to provide the statistics to a user in a graphical format. Reports may be provided on a per component basis, or statistics aggregated for a parameter over execution of multiple components. As a component implements an operation, or function, each component may have a unique set of parameters to measure, wherein an accounting infrastructure maintains appropriate statistics for each component. For example, for some components it is desired to measure computing time or memory allocations, whereas for others latency and delay are critical parameters and it is desired to measure these. Applications and operations may be services used by different groups, wherein each user group implements individual features of a service. Consider a component implementing an operation to search for goods; the component may also implement other operations, or sub-operations, including, searching, selecting, requesting information from the user, providing comparison information, etc. A first user may implement the component using the operations for searching and selecting, and not provide comparison information. A second user may implement the component using the operation for providing comparison information, and use a different component for searching, etc. Each use of the component may incur measurement of a different set of parameters. Compilation of these statistics allows the user to monitor a parameter associated with an individual component of the composite service.

The compilation of the statistics is presented to the user in an easy to read format. In one example, an object representation of measurements and statistics is available as a report to a user of the services, wherein the representation includes statistics per component and per operation. The representation may be exported in different formats for the user. In one example, the accounting infrastructure provides capability to the user for monitoring the various statistics.

FIG. 1 illustrates a system 100 for providing a composite service through a composite service system 110. Composite service system 110 includes a processing unit 112, a composite service unit 114 and an accounting engine 116. Processing unit 112 is a central processing unit for the composite service system 110, providing control and data to enable functionality of system 110. Processing unit 112 communicates with various modules within system 110 through a communication bus (not shown). Composite service unit 114 provides functionality for implementation of a composite service available in system 110. Composite service unit 114 includes memory (not shown), both volatile and non-volatile, to store and execute software code for implementing services. Composite service unit 114 serves to enable and control each of multiple services, and may include hardware, software, firmware, or a combination thereof. Software code for service(s) may be provided to composite service 114 from memory within system 110, may be received from an external storage location or cache, or may be provided to composite service 114 by a communication or transmission from one of multiple computing or communication devices having access to system 110.

Processing unit 112 may, for example, be an application server or a PC, wherein software adapted for control by processing unit 112 may have access to the Internet in order to identify services, such as web services. System 110 includes memory storage (not shown), which may be part of a memory storage system, and a controller to identify and access data on the storage system, such as on a hard disc drive. System 110 may further include a memory system such as a Random Access Memory (RAM) that is configured to store data. Processing unit 112 may, for example, be a Central Processing Unit (CPU).

System 100, as illustrated, may include multiple devices and other services accessing composite service system 110. The multiple devices include computers 120, 132, and 134, computing network 140, and wireless network 102, which includes a variety of wireless devices, including a cable type television service 104, a Personal Digital Assistant (PDA) 106, and a cellular phone 108. Additionally, composite service system 110 may be an enterprise system within an organization enabling end-to-end processing for a variety of services, including reporting functionality for these services. In an enterprise system, a composite service may integrate multiple complex services into a flexible, decentralized composite service. The ability to account for individual services, their operation and components, by evaluation and analysis of parameters and statistics related thereto provides visibility to the designer of a composite service system. Open integration provides process-centric collaboration and better understanding of the impact of individual components on each other as well as on other services.

The computing network 140 may be a Local Area Network (LAN) or another configuration of computing devices which access system 110 through network 140. Computing network 140 may be accessible to a variety of computing and communication devices. Computing network 140 may include a router, processing communications for multiple computing and communication devices, and other enterprise networks.

Computer 120 is illustrated including a processor 122, a memory 124 and a composite service unit 126, including an accounting engine 128. Additionally, computer 120 uses a user interface 130 for interaction with the user. User interface 130 may be included within computer 120 or may be a separate unit in communication with computer 120. User interface 130 includes a display device and display processor (not shown) to provide a visual or audio display of accounting information and the corresponding report presented to a user. The user may interface with system 110 through computer 120 to develop services, perform maintenance on services, obtain reports and accounting information, and otherwise interact with composite service system 110.

Figure 2A:
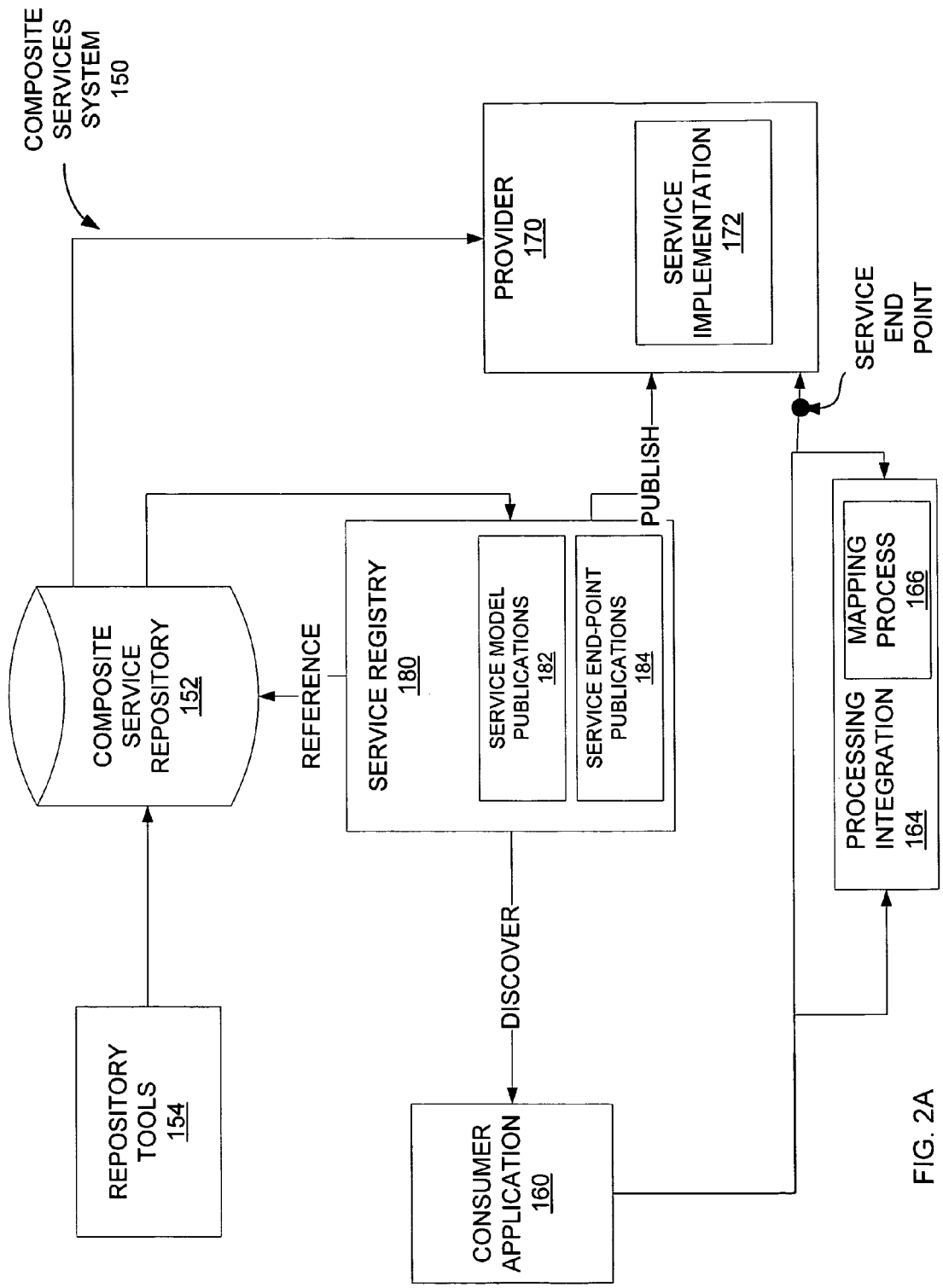
FIG. 2A is a diagram of a composite service system according to an example embodiment.

FIG. 2A illustrates an example embodiment of composite service system 150 similar to composite service system 110 of FIG. 1. Composite service system 150 enables enterprise SOA, providing open-ended access to multiple services. In a SOA, a service may be a unit of work done by a service provider, wherein the service provides a desired result for a service consumer. Composite service repository 152 includes operational instructions for various services included in the composite service. The system 150 supports real-time applications and services, which typically require immediate results and response to a user, and are referred to as synchronous activities. As an example, real-time services typically require middleware to provide consistent application interfaces, such as to be exposed to web services. The middleware sits between the user machine and the web service. The exposed service(s) are to be available for discovery by developers. The service(s) are retrieved and placed in a central repository for reuse. The service(s) is then included as part of a composite service processed by system 150, which in this case contains the middleware providing connectivity and secure communications for users to use the composite service.

The system 150 includes composite service repository 152, which receives design and modeling tools from repository tools 154. Composite service repository 152 provides a central location in which enterprise services are modeled and metadata is stored. Composite service repository 152 stores definitions of enterprise services and business processes, stores the metadata for service objects, and provides central design and modeling. Composite service repository 152 receives reference information from service registry 180, which supports publishing, classifying and discovery of enterprise services. In one example, service registry 180 is compliant with Universal Description, Discovery and Integration (UDDI) specifications, and enables management and governance of services.

Composite service system 150 further includes consumer application 160 providing at least one service. Consumer application 160 receives discovery information from service registry 180, and communicates with provider 170 directly and through processing integration 164, which provides integration for services within a composite service. Within processing integration 164, mapping process 166 maps consumer application 160 within an integrated composite service, wherein consumer application 160 uses an enterprise service. Provider 170 includes service implementation 172, which is the point of interface with consumer application 160, processing integration unit 164 and mapping process 166. An example of provider system 170 may be an offering within composite service system 150, such as a particular store within an online retailer service, or a geographical mapping service within a search website. In another example, provider system 170 includes all products and service offerings for an entity. Consumer application 160 may include a browser or other program or user interface used to access provider system 170. An enterprise system incorporates a variety of provider systems 170 and links these with consumer applications 160.

Figure 2B:
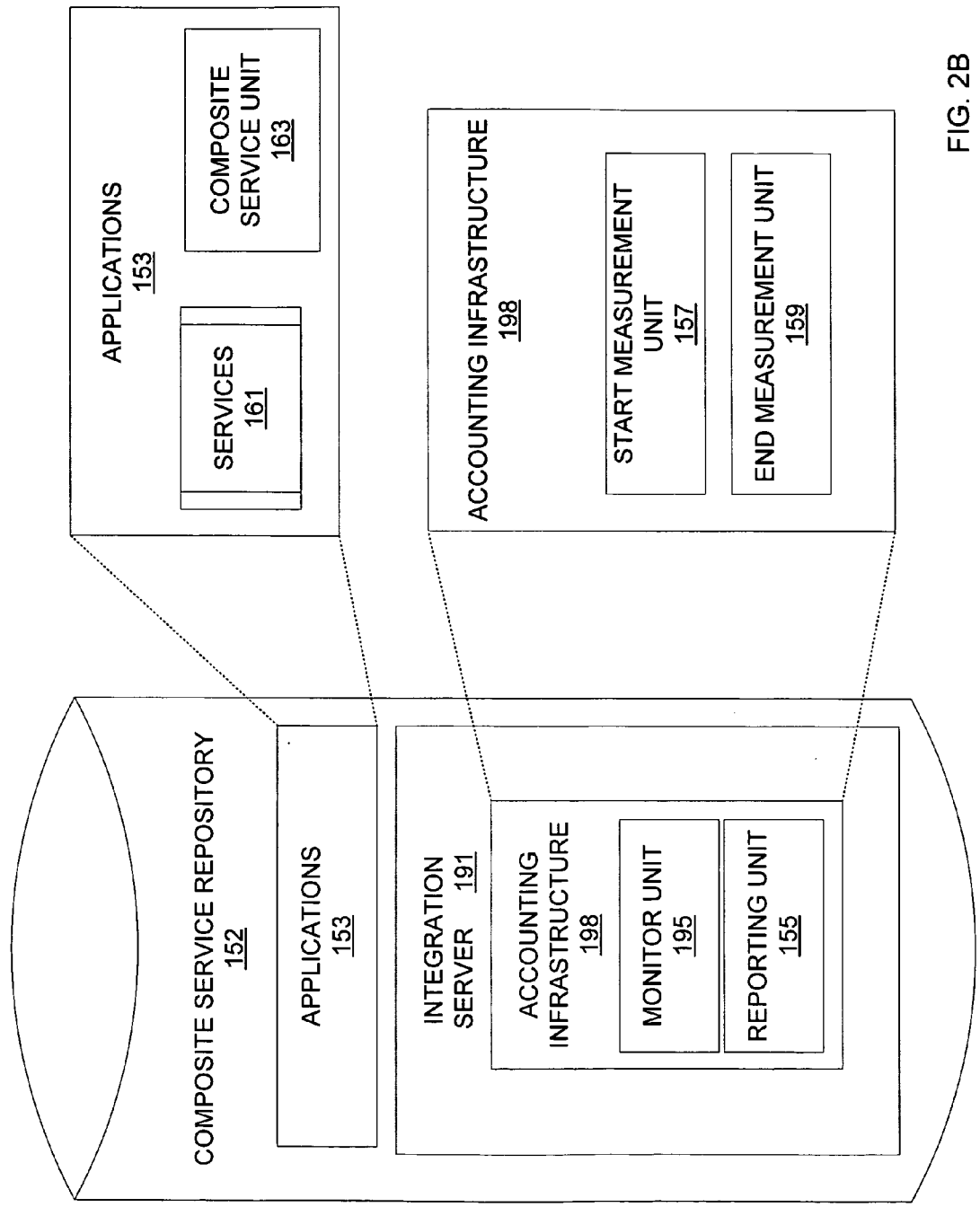
FIG. 2B is a diagram of a composite service repository as in FIG. 2A, according to an example embodiment.

FIG. 2B illustrates an example embodiment of a composite service repository 152 as in FIG. 2A, including applications 153, which may include software or computer programs for implementing at least one or all of the multiple services offered within a composite service. Additionally, composite service repository 152 includes integration server 191, as described in FIG. 3, having accounting infrastructure 198 and monitor unit 195. Integration server 191 as in one example embodiment is a Java server. Alternate embodiments may employ other type servers, adapted for integrating multiple services into a composite service. Integration server 191 further includes reporting unit 155, configured to receive statistics from accounting infrastructure 198 and generate a presentation format for the statistics. As illustrated, accounting infrastructure 198 of one embodiment includes start measurement unit 157 and end measurement unit 158, operation of which are described with respect to FIGS. 6, 7A and 7B. Further, in one embodiment, applications 153 include services 161 and composite service unit 163. Services 161 include application programs for the individual services and components. Composite service unit 163 is configured to control and manage a plurality of services in a composite service, including services 161. Composite service unit 163 operates in coordination with integration unit 191 which is configured to integrate a plurality of services with accounting infrastructure 198, or accounting unit, and reporting unit 155.

Figure 3:
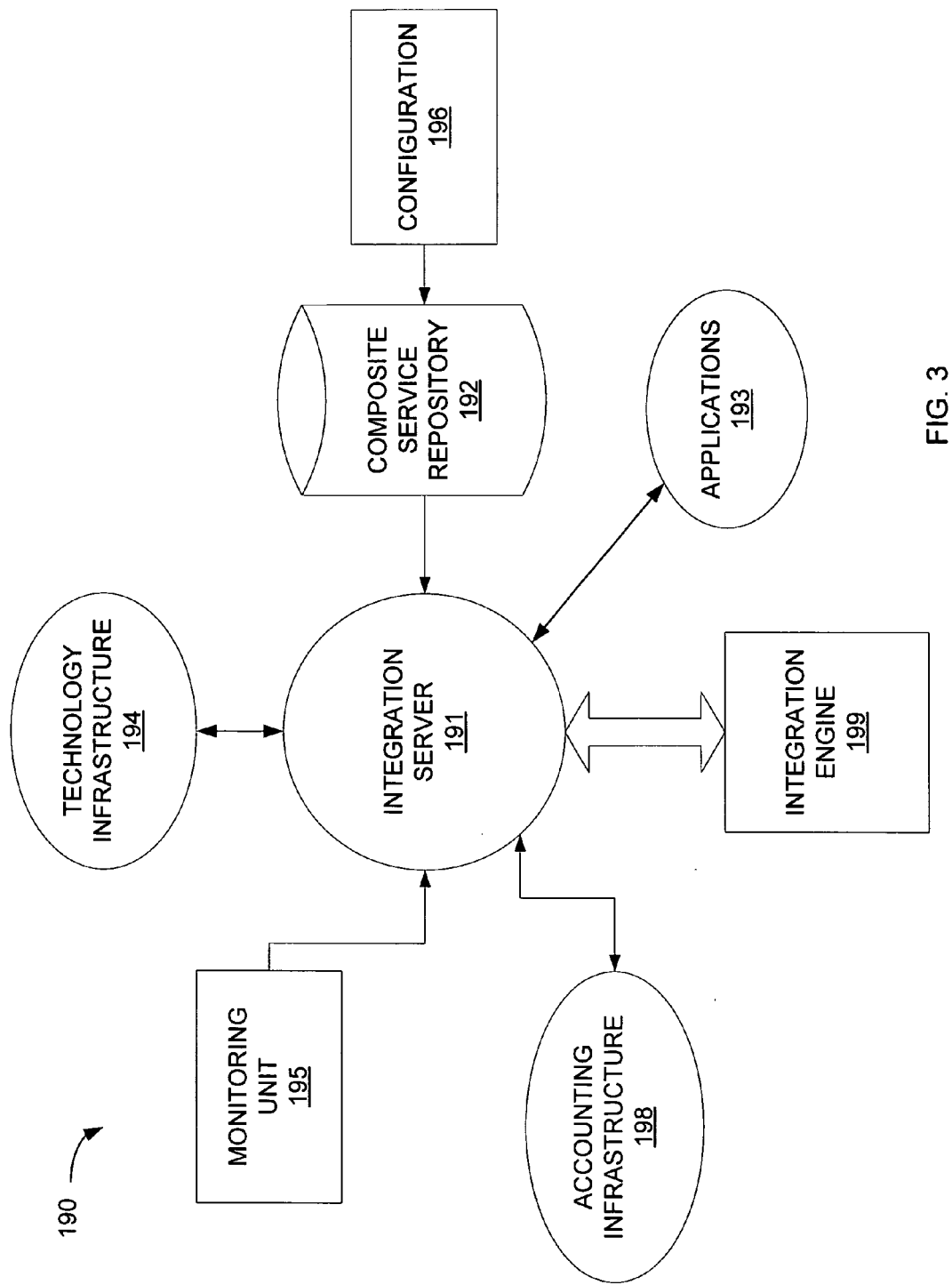
FIG. 3 is a diagram of integration within a distributed network system supporting composite service as illustrated in FIG. 1, according to an example embodiment.

FIG. 3 illustrates a portion 190 of system 100 as illustrated in FIG. 1 implementing integration of various services in integration server 191. In an example embodiment of FIG. 3, composite service repository 192 provides service information to integration server 191, which acts to integrate various services. Various modules communicate with integration server 191, either directly or through a communication via other modules. As illustrated, applications 193, composite service repository 192, technology infrastructure 194, accounting infrastructure 198, and monitoring unit 195 are all in communication with integration server 191. Composite service repository 192 receives information from configuration unit 196. Message flow within integration server 191 implements routing of data and messages, as well as controlling transformation processes, including activities requiring processing power and may therefore impact performance. Routing and transformation, which take place in a runtime environment during operation of services, involve integration server 191 and integration engine 199. Integration engine 199 serves as a distribution mechanism to process messages within a service.

Accounting infrastructure 198 is applicable to any of the multiple services within a composite service and may be used to compare specific services, or operations and components within each service. For example, it may be desirable to understand which operations, functions or components are causing delays in a process or which require the most volatile memory. Specific function(s) of a service, as well as the type and number of services in a composite service structure, will determine the parameters and statistics of interest. By providing insight into the behavior of individual components of a service, accounting infrastructure 198 allows service design and modeling to accurately account for weaknesses or fault points. Accounting infrastructure 198 includes monitoring functions implemented by monitor unit 195, and reporting functions implemented by reporting unit 155. Accounting infrastructure 198 further includes an accounting engine, such as accounting engine 116 of FIG. 1, which provides control and implements rules for operation for monitor unit 195 and reporting unit 155 of accounting infrastructure 198.

Typically, a service is defined by a provider, a client, an interface, an operation, inputs and outputs. Internally, the service has a variety of parameters and variables which are not typically available to a user through an interface during operation of a service. A user interface may provide detailed information on the service. A business model is a composition or assembly of services, made up of operations, or functions, wherein operations are integrated through integration server 191 of FIG. 3, and are controlled to allow sharing of data and business processes among services, applications and data sources within a business.

Components may be defined by methods in abstract or technology-independent terms and are ideally agnostic to computer specifics, operation systems, and software application. Web services generally include a particular set of specifications for service-oriented integration with documents as the payload, such as documents in an XML format. The document provides information used by the service interface for accessing and using the service. A common protocol used for communication of XML documents is the Simple Object Access Protocol (SOAP) used to encode messages in a web service request and response. A web service may be part of a composite service or may be a composite service, providing individual user interfaces to a set of services linked by similar business rules, processes, information requirements, applications, quality of service definitions, etc.

Often a composite service will have one or more service interfaces that are published or made available to the public, such as over the Internet. Publication information provides a description of a service and provides guidance and directions on how to use the service, what information is required and what the output will be to the user and/or to other services. Typically, a composite service does not provide specific information as to the internal parameters and activities which occur in operating the service. For example, a web service for a financial institution may provide the user with various options to access accounts, perform actions, and generate reports. Each available action or activity, as well as each report may be defined by a distinct operation, and a component may implement one or a variety of operations. In this way, the various operations of the web service are implemented in one component, but are monitored by an accounting infrastructure, such as accounting infrastructure 198.

Functions are implemented by components which are modeled as one or more objects. Each object has a state and a behavior. The behavior of an object may be directly related to a measured parameter. The reporting function may be provided for an individual operation, component or service, with several different reports available. When a user requests a summary report, the summary report may aggregate the measurements and statistics for several individual components into a summary. Some activities for a component may not be visible by a user, even though at least some of this information is available to accounting infrastructure 198 by accessing the individual component. In one example, a first operation calculates an investment portfolio, and a second operation calculates a banking portfolio. A summary report to a user provides an overview of both portfolios, but does not provide the detail or granularity available to accounting infrastructure 198 in monitoring and generating statistics for the operations.

Figure 4:
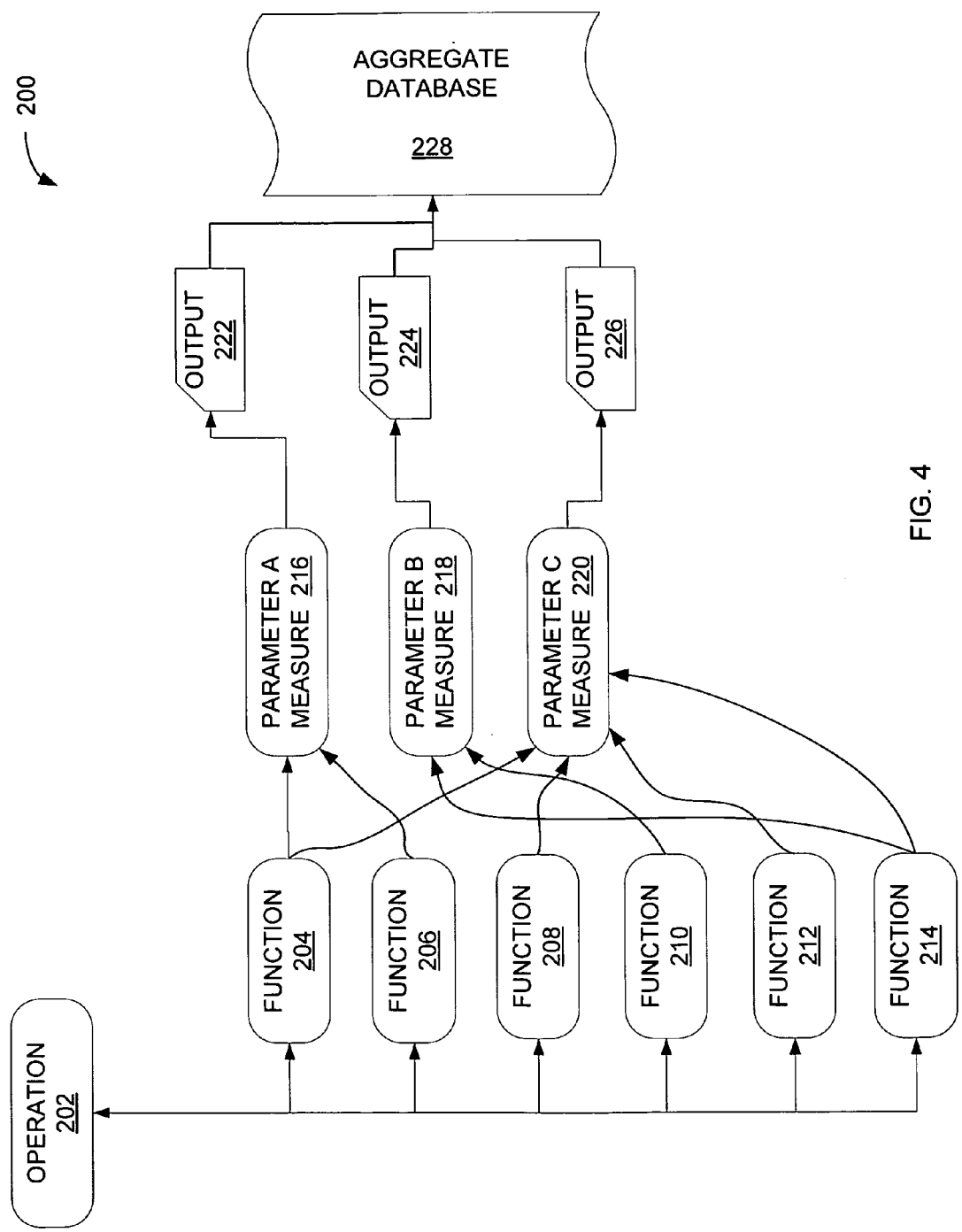
FIG. 4 illustrates parameter measurement of an operation for output to an aggregate database used in reporting on parameters of the operation according to an example embodiment.

An overview of a service in a composite service is illustrated in FIG. 4. Accounting infrastructures, such as accounting infrastructure 198 of FIG. 3, provide analysis and detail to a developer of a composite service(s). As in FIG. 4, operation 202 includes functions 204-214. In one embodiment, an accounting infrastructure includes parameter measurement units, such as units 216, 218, and 220. In the illustrated example, parameter A measure 216 measures at least one parameter which has significance for at least one component executing functions 206 and 204, which provide data to parameter A measure 216 for monitoring, tracking and analyzing parameter values. Parameter B measure 218 monitors functions 204 and 214; parameter C measure 220 monitors functions 204, 208, 212, and 214. Note, there may be multiple parameter measurement units for a same measurement to reduce the load on any one unit for those parameters which are more commonly desired to be measured for execution of multiple components.

Parameter measurement units 216, 218 and 220 provide output reports and data as outputs 222, 224, and 226. This information is then provided to aggregate database 228, which compiles information, making it available for reporting to a system developer or user. As used herein, the system developer may be a user as well. Aggregate database 228 records a variety of information, the specifics and form of which may be modified, changed, and edited. A goal of a composite service is to provide efficiency and flexibility to a business process or other process. Accounting infrastructure 198 is adaptable and dynamically adjustable to accommodate specific needs, requirements and goals of a process. This allows a developer to easily change information to be monitored, the data output, the form of reports, etc. In one example, a developer inputs the set of parameters to monitor for one service or for one component. Accounting infrastructure 198 provides a report on those parameters, including use statistics, which allows a developer to identify a lengthy process or one that is introducing congestion into a service or affecting other services in a composite service.

Figure 5:
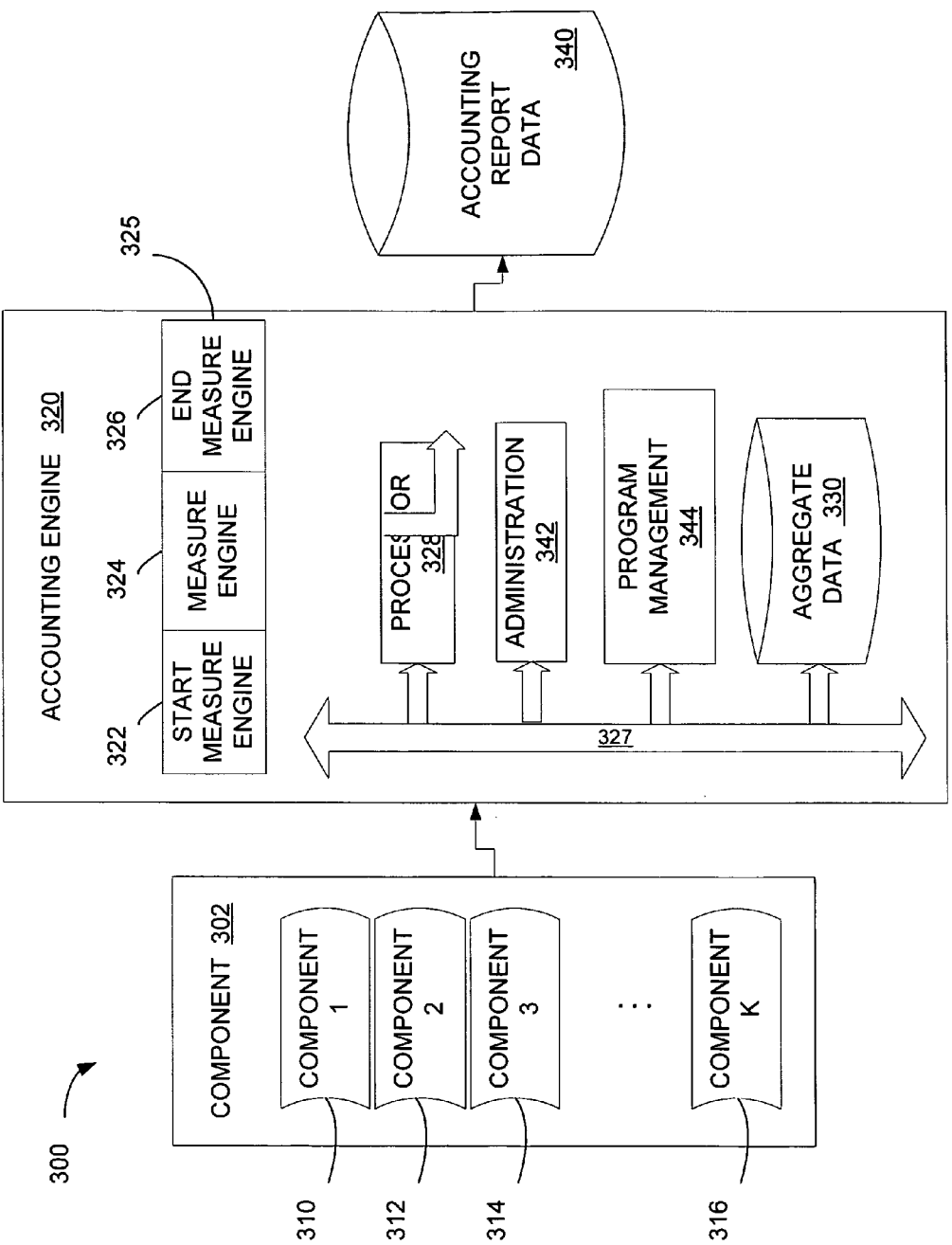
FIG. 5 is a diagram of a portion of an accounting infrastructure for a network supporting composite service, according to an example embodiment.

Parameter measure units 216, 218 and 220 are included, in one example, in an accounting engine, such as accounting engine 116 in FIG. 1 and accounting engine 320 in FIG. 5. Accounting engine 116 may also be referred to as an accounting unit. In one embodiment, accounting engine 116 includes the modules of accounting infrastructure 198. In another embodiment, accounting engine 116 coordinates operation with accounting infrastructure 198.

As illustrated in FIG. 5, system 300 includes component 302 as part of at least one service, having multiple components 310-316. Components 310-316 may be processed sequentially or in an order specified by component 302 or as indicated according to user preferences and selections. Examples of component processing are discussed herein below with respect to FIG. 8A. As illustrated in FIG. 5, the component 302 communicates with accounting engine 320, wherein communication may be determined during design of accounting engine 320. Accounting engine 320 includes parameter measurement capability as well as statistical analysis tools. Alternate embodiments may provide these as separate modules or in combinations thereof to allocate processing and analysis according to the design and needs of the network or service. Accounting engine 320 includes measurement unit 325 having start measure engine 322, measure engine 324 and end measure engine 326. Measurement unit 325 communicates with processor 328 and aggregate data 330. Accounting engine 320 measures parameters, determines statistics and provides information to accounting report data 340 for preparation into reports as required or requested by the user. System 300 may be implemented within a system supporting a composite service or within a distributed enterprise network. Alternatively, portions and functionality of accounting engine 320 may be distributed and performed by client machines or software modules resident within system 300 or a network, such as network 100 of FIG. 1. Accounting report data 340 includes parameters and statistics, but may be implemented as a subset of data. The data in accounting report data 340 is arranged to identify individual components and evaluate parameters and statistics. Additionally, the data allows a user to evaluate service performance individually and as part of a composite service.

Accounting engine 320 includes communication bus 327, which allows communications among the various modules, units and functions. Measurement unit 325, processor 328, administration unit 342, program management unit 344, and aggregate data 330 communicate through bus 327. Alternate embodiments may incorporate individual direct connections and communication between specific modules.

Figure 6A:
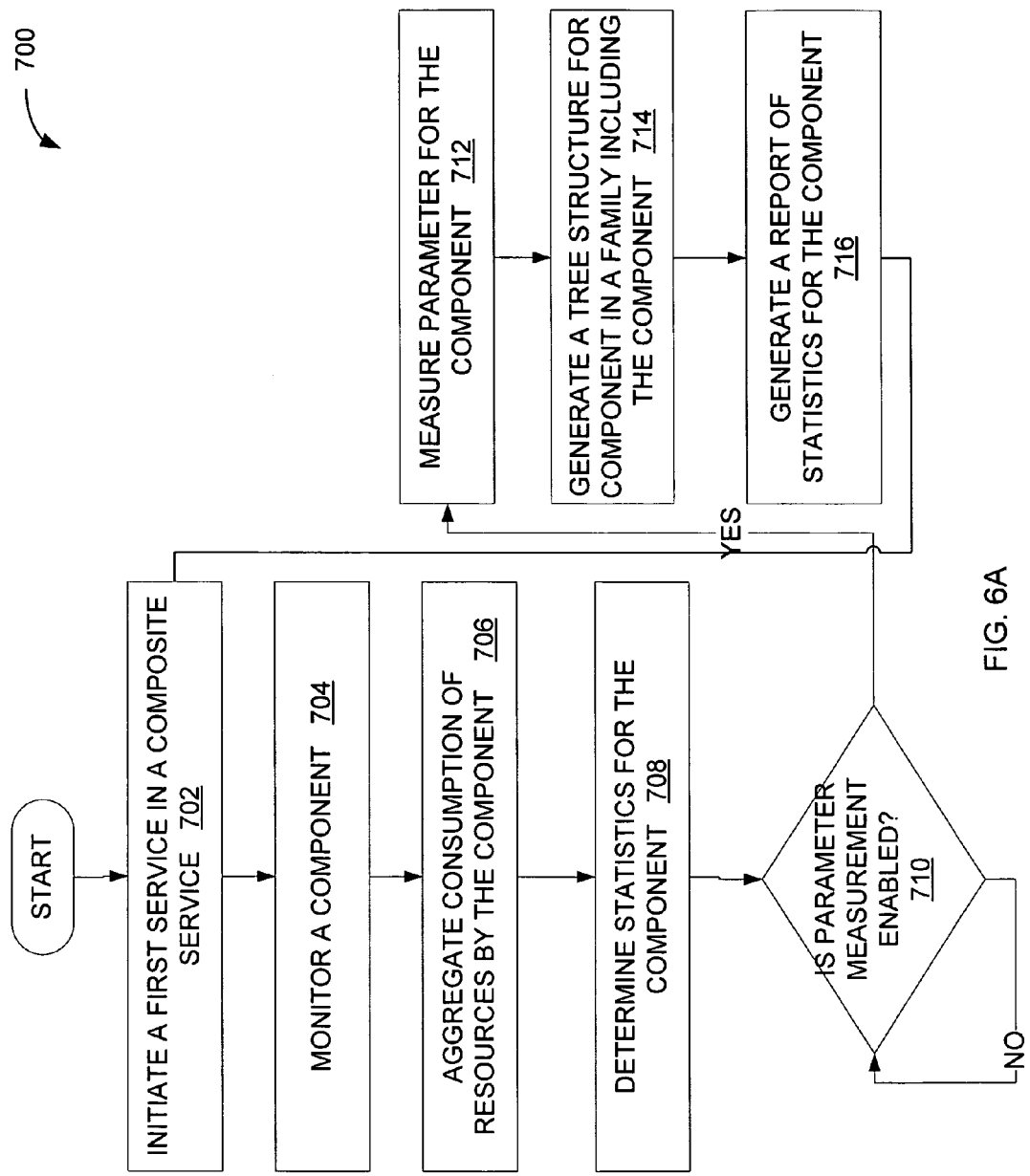
FIG. 6A is a flow diagram of a method for measurement procedures in an accounting infrastructure, according to an example embodiment.

FIG. 6A illustrates implementation of accounting infrastructure 198 within execution of composite service according to an example embodiment. As illustrated, process 700 begins by initiating a first service in a composite service, 702. A component is monitored, 704, and consumption of resources by the component is aggregated, 706. The process determines statistics for the component, 708, and determines if a parameter corresponding to at least one of the statistics is enabled for measurement of this component in the first service, 710. If the parameter measure is enabled, processing continues to measure the parameter for the component, 712. If the parameter measure is not enabled, the process continues to check if other parameter measurements are enabled. For measurement of a parameter for a component which is part of a family of components, a tree structure is generated, 714 and reported, 716.

In one example embodiment, a process monitors a first component by starting or initiating measurement of a parameter. A start tag is created corresponding to a first execution point in an execution thread of the first component, the first execution point identifying a start of the measurement. When the process ends the measurement, a corresponding end tag is created, corresponding to a second execution point of the thread. The second execution point identifies an end of the measurement. Where the first component is one of a family of components, such as where the first component has children or a parent, the process aggregates consumption of resources for the family of components. In this example, the process creates a first statistics object for the parameter and aggregates measurements of the parameter for all members of the family of components. The parameter, in one example, is a measure of computing time used by the component, or family of components, from the first execution point to the second execution point. In another example, the parameter is a measure of delay or latency in performing an action or delivering information associated with the first component.

As described herein, accounting infrastructure 198 implemented for use with a composite service system allows identification and tracking of individual components, families of components and functions by monitoring and measuring specific parameters. Accounting infrastructure 198 provides more than a snapshot or current status of system resources, by analyzing parameters over a window of operation or following functions within a thread of execution. For example, accounting infrastructure 198 according to one example, initiates measurement at a first point in the execution thread of a component. Each time the system uses the component, a measurement is initiated at the same point. The measurement may continue to be taken during execution. At a second execution point of the execution thread, measurement is ended. In this way, a report will identify the resource use during specific phases of component operation, as well as identifying the interaction during that period of the component with other components. The ability to identify resource use and consumption at the thread and execution level, as well as the ability to identify historical statistics related to use is particularly advantageous in design, operation and maintenance of a composite service. In one embodiment, the accounting techniques are applied to individual threads running in a Java environment. In alternate embodiments, the accounting techniques are applied to other execution tracking methods for programs, applications, and libraries in other ways.

Figure 6B:
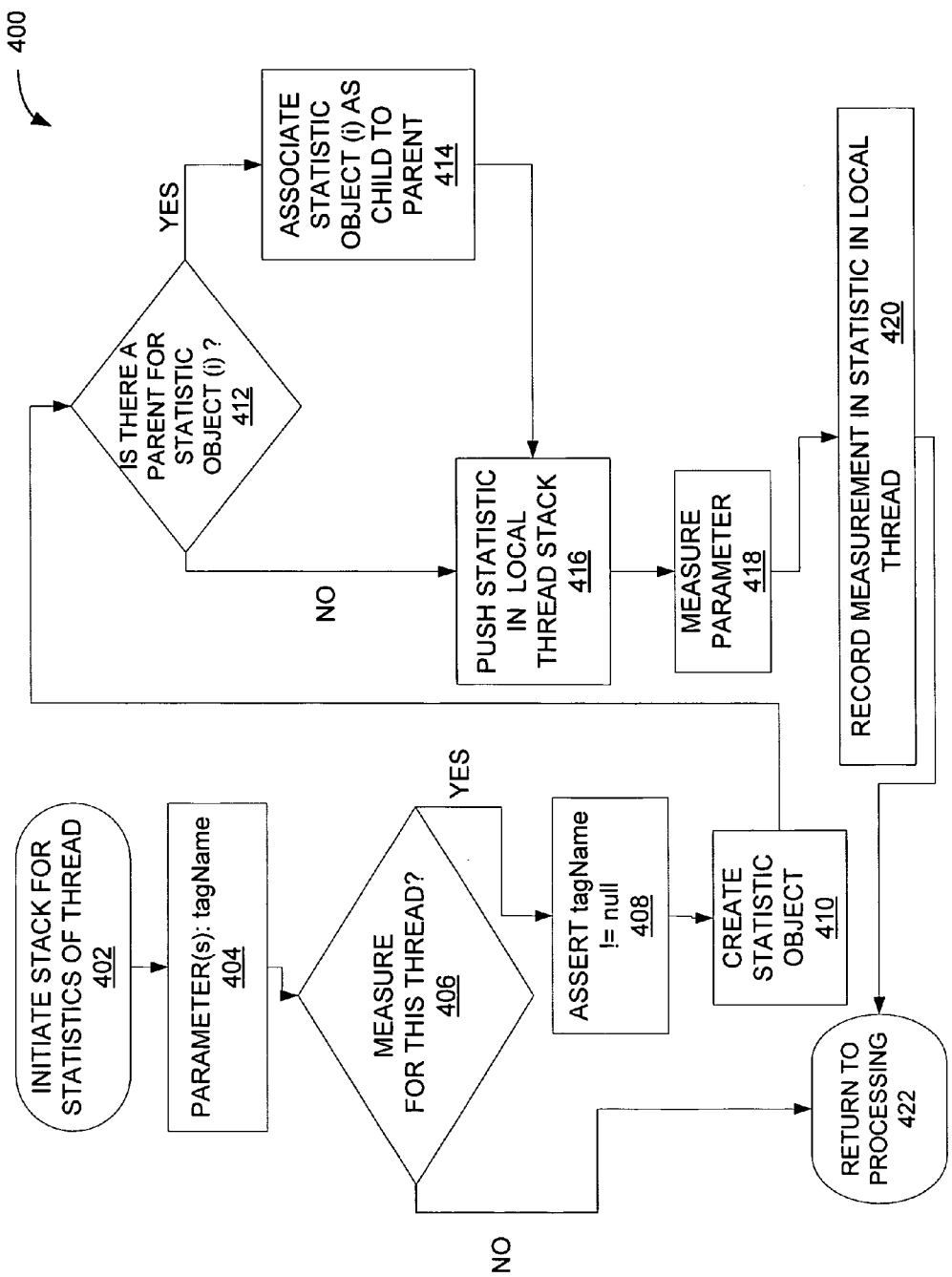
FIG. 6B is a flow diagram of a method for initiating measurement procedures used by an accounting infrastructure, according to an example embodiment.

FIG. 6B illustrates a method 400 to start measurements in accounting infrastructure 198 according to one example which is implemented according to an object-oriented programming language, such as Java. Programming techniques, such as available in a Java implementation, are often used in distributed programming, as such programming languages are cross-platform, object-oriented and compiled in an intermediate binary form to be interpreted by a virtual machine, referred to as a Java Virtual Machine (JVM). Java program components, as used herein, are referred to as objects. Each object is defined by a class and has a method; an object is specified by properties. Each object class may belong to a super-class which includes multiple specific sub-classes, wherein the super-class is a broader definition encompassing the sub-classes. Integration server 191 and accounting infrastructure 198 may be implemented using other programming models, wherein tracking of execution of software routines allows measurement of parameters and identification of measurement execution points.

Processing of an operation, or function, is tracked by following the flow of the operation, i.e., thread. The thread follows the actions and activities involved with execution of the operation. For example, a thread will identify each software routine used in the process.

Figure 7A:
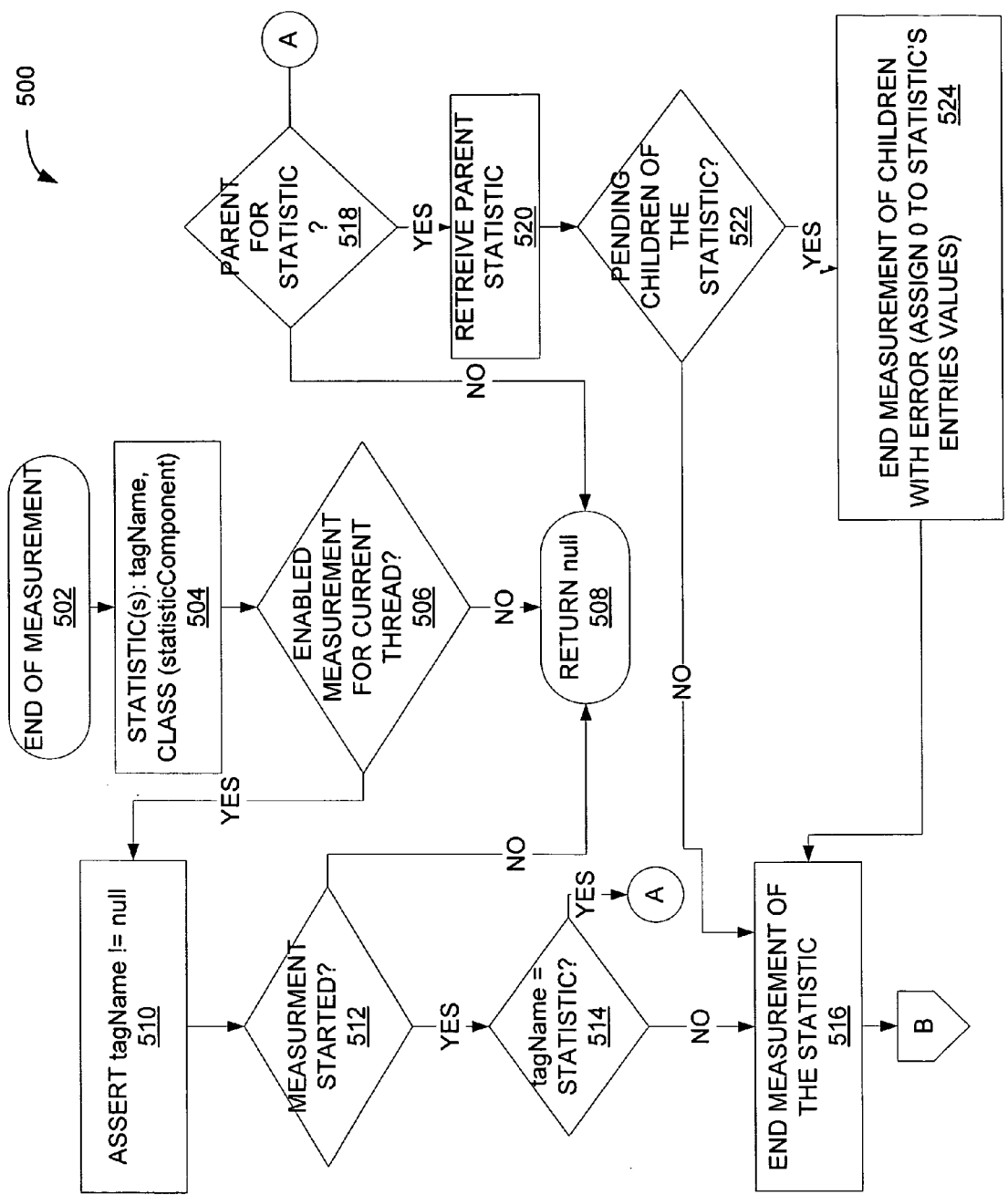
FIGS. 7A and 7B illustrate flow diagrams of termination of a measurement method as in FIGS. 6A and 6B, according to an example embodiment.
Figure 7B:
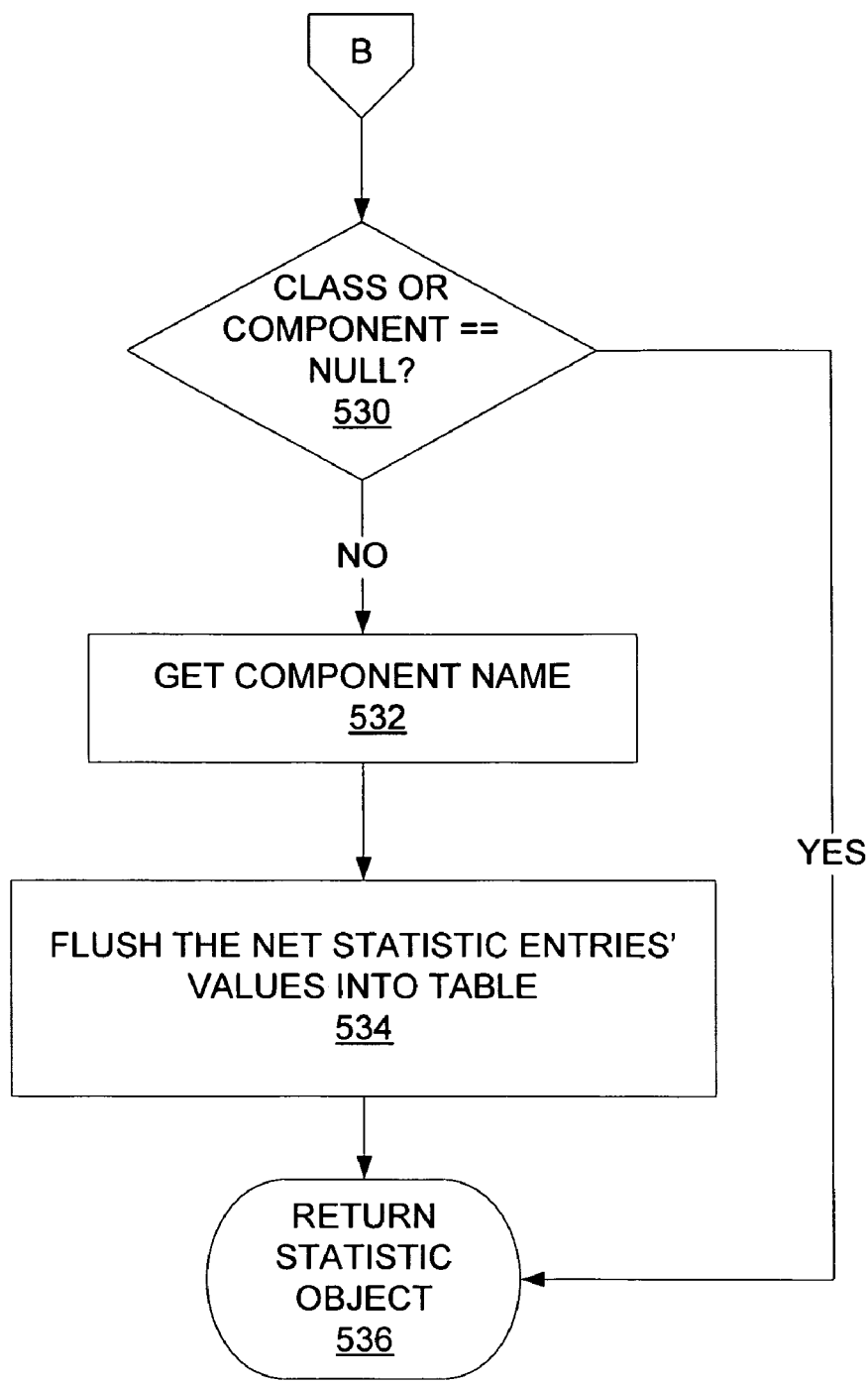

FIG. 6B illustrates a method for monitoring and tracking a thread. In particular, the method 400 is used to start a measurement, and has an associated method for ending the measurement as illustrated in FIGS. 7A and 7B. The method 400 initiates a stack for maintaining measurements and statistics for a thread, 402. A thread provides an execution context following processing of the operation. In one example, a thread is a sequential flow of control within a program.

In one embodiment, parameters identified for measurement are each assigned a unique tag-name, 404. It is determined if measurements are to be made for this thread, or if the current measurement has meaning or significance in this thread, 406. The tag-name in one embodiment is a human readable tag. Accounting infrastructure 198 tags the start and end points in the thread to identify those points in the process where measurements are made. In this way, accounting infrastructure 198 is able to identify consumed resources for a given thread. The measurements may be consistently made at a same point in an operation, or may be defined by the process, wherein measurements points are dynamically determined. The tags identify measurement points in a thread and allow later review by a user to analyze the history and statistics associated with multiple threads. This allows a user to evaluate where consumption of a given resource is incurred in an individual thread.

If the measurement is not to be made in this thread, then the measurement is not started for this thread, and processing continues, 422, waiting to start a next thread. If the measurement is to be made for this thread, the process initializes the tag-name associated with the parameter, 408. In this example, initialization of a parameter sets the tag-name variable to null. At this point, accounting infrastructure 198 creates a statistics object corresponding to the parameter to measure having the tag-name, 410. The creation of a statistics object facilitates management of the parameter as a variable, allowing tracking and reporting in a user-friendly format. Once an object is created, the process determines where the object fits in a tree. A tree is used to describe the relationship among objects. Each node in the tree corresponds to an object, wherein a super-class object will include nodes to objects in the super-class, which are also referred to as children of the super-class node. The use of tree structures is another advantage in using object-oriented programming to implement accounting infrastructure 198, as objects and their relationships are easily viewed in reporting and other graphical presentations. The relationships among objects are readily identified. In one embodiment, the statistics objects correspond to components and component families, wherein the tree structure for the statistics objects mirrors the tree structure for the component family.

In the present example, method 400 continues to determine if a parent exists for a created statistics object, 412. If the current statistics object is a child of a known parent, the statistics object (i) for the present current statistics object is associated with the parent object, 414. The statistics object (i) is then pushed on stack, 416. A stack is a local stack for a current thread; the local thread stack may be part of an aggregated stack including threads for other components within the service. When a parameter is currently identified for measurement, process 400 continues to measure the parameter, 418, and store the measurements in a local thread stack 420. The specific parameters selected for monitoring and measurement may be predetermined in advance, or may be specified by a user. Accounting infrastructure 198 may be used for performance investigations, profiling operation per component and per operation. Additionally, accounting infrastructure 198 enables administration of the system, by accounting for information on each component to analyze and troubleshoot operation and problems, such as a slow system startup, operation outside of specifications, or poor performance during startup of a component.

FIGS. 7A and 7B illustrate a method to end measurements for accounting infrastructure 198. Method 500 detects the end of measurements, 502, and retrieves the statistics object tag-names and the class information for each statistics object, 504. The method then determines if measurement is enabled for the current thread, 506. If yes, the method retrieves or asserts the tag-name associated with each parameter, 510, and determines if a measurement has started, 512. If the parameter is not used to generate statistics, 514, the measurement ends, 516. Else, processing continues to identify parents, 518. If a component has no parent or if measurement is not enabled for this thread, the processing returns a null value, 508. If there is a parent for the parameter, 518, the parent statistic is retrieved, 520. If there are pending children of the statistic, 522, the method ends the measurement of children. In this way, the process catches programming errors, such a missing end statement for a pending child. In this case, the process identifies the error and provides a message indicating a component needs correction. Continuing, when there are no pending children, 522, the method ends measurement of this parameter and statistic, 516. When the method ends the measurement, 516, processing continues as illustrated in FIG. 7B, to determine if the component is null, 530, indicating the class or type of the component is null. If the component is null, processing continues to return the statistics object, 536; if the component is not null, processing continues to get a component name, 532. For this component, the process flushes the net statistics entry values into a tabular format or table, 534. Flushing information indicates the information is pushed onto a stack corresponding to this statistic and component, wherein information is aggregated for children of a component. Finally, the method returns the statistics object, 536. In this way, on completion of the measurement, the statistics object includes all of the current measurement information for reporting and analysis.

Accounting infrastructure 198 will measure various time periods for activities of the service, computing time consumed by the service and the various components thereof, amount and type of memory storage utilized, as well as other parameters of the service. An accounting engine 320 of FIG. 5 includes administration module 342, and program management module 344, which are each coupled to bus 327.

As an example of a measurement event, consider a first scenario where the goal is to measure time delay, CPU computing time and memory usage involved in operation of a component. In this scenario, a service within the composite service is run, while accounting infrastructure 198 monitors operation. Accounting infrastructure 198 deploys several modules, each performing a unique function.

Deployment to initiate execution of an operation is enabled by administration unit 342, which performs necessary checks and preparation, including coordination with other operations and services, validates information, initializes variables, resolves conflicts, provides for parallel evaluation, delivery of information, storage of values, and other functions for each execution. Accounting engine 320 controls parameter measurements by running concurrently and independently from the operation under consideration. In an alternate embodiment, accounting engine 320 may initiate a test and run interactively with the operation.

After deployment, program management 344 controls execution of a component, or operation. In one embodiment, program management unit 344 implements and controls parallel processing, allowing efficiency and overall comprehension in providing composite service. Program management 344 includes policies and rules for implementation, control and interoperability of the specific operations and functions which make up the services, including programming language, macros, routines, subroutines, libraries, and other information defining operation and execution. Accounting engine 320 measures parameters and stores information related thereto through completion of component 302, storing the information in aggregate data 330.

Note, while accounting engine 320 is illustrated in the present examples as including units 322-330, alternate examples may provide each of these functions separately from accounting engine 320. Additionally, the functionality of these units may be combined within a software module or hardware module for implementation within accounting infrastructure 198. In one embodiment, the measurement functions are built in component 302 and information communicated to accounting engine 320 for analysis and reporting. Aggregate data 330 is a memory storage device, which may include volatile and non-volatile memory, and may be implemented within accounting engine 320 or external to accounting engine 320. Similarly, accounting engine 320 may include accounting report data 340. Report generation may be provided by accounting engine 320.

In another example of a measurement event, administration unit 342 is used to accumulate and list information for each component for investigation of system performance. For example, a user may want to understand the limiting component or operation during the initial start up of a service. Identification of the problem may be done by the developer, user or by the system according to predetermined rules. Such rules may be based on parameter values falling out of a threshold or range. For example, specification for the service may restrain the start up procedure to a specific time allowance, wherein the system alerts the user when the specification limits are approached or exceeded. Other problems or areas of consideration may concern memory usage, such as on receipt of an Out Of Memory (OOM) type error. Other considerations involve poor performance during a specific operation, based on errors received, users input, third party complaints, or otherwise identified issues. Further, resource allocation and conservation may provide goals for evaluation.

Accounting infrastructure 198 provides a powerful framework for analysis of composite service. The examples provided herein may be implemented in a simple, streamlined manner, such as in a library. In the examples described herein accounting infrastructure 198 may be implemented as a low level library, such as in a Java stack, so as to be available to other components. Accounting engine 320 as in FIG. 5 may be enabled or disabled, and is configured to measure any of the parameters of interest, including time for operation, memory allocation, computing resource allocation, etc. Alternate embodiments may implement accounting engine 320 according to the goals and requirements of the system and services.

Accounting infrastructure 198 is able to monitor execution of operations within a composite service, and additionally is able to identify locations in execution of a component, such as in software code, where measurements start and end. Where additional measurements are made during execution of a component, these may be marked with tags as well. For example, accounting engine 320 may provide markers corresponding to a location in the software instructions or code for component 302 of FIG. 5. In this way, a user is able to later understand the locations of each measurement and isolate the operation corresponding to each statistic. In one example, markers are provided as human readable string tags for each measurement. In another example, a separate document or file is created to identify positions within the component 302 and the corresponding measurement activity.

Accounting report data 340 provides information for reporting, and may prepare a report for display. The number of entries and the type of measurements in the list of measurement entries depends on the measured component, the service and operation, as well as the measurement parameter. The statistics information is stored in accounting report data 340, such as in a tree structure consistent with a tree describing components 302. The statistics information may then be presented to the user in a tree structure, facilitating identification of operations under consideration, and the role of these operations within the composite service. In one embodiment, the use of object-type representations is in addition to logged tables in traces, wherein the object representations are flexible and may be easily logged, parsed, and converted to other formats for communication and transmission, such as to XML format.

Figure 8A:
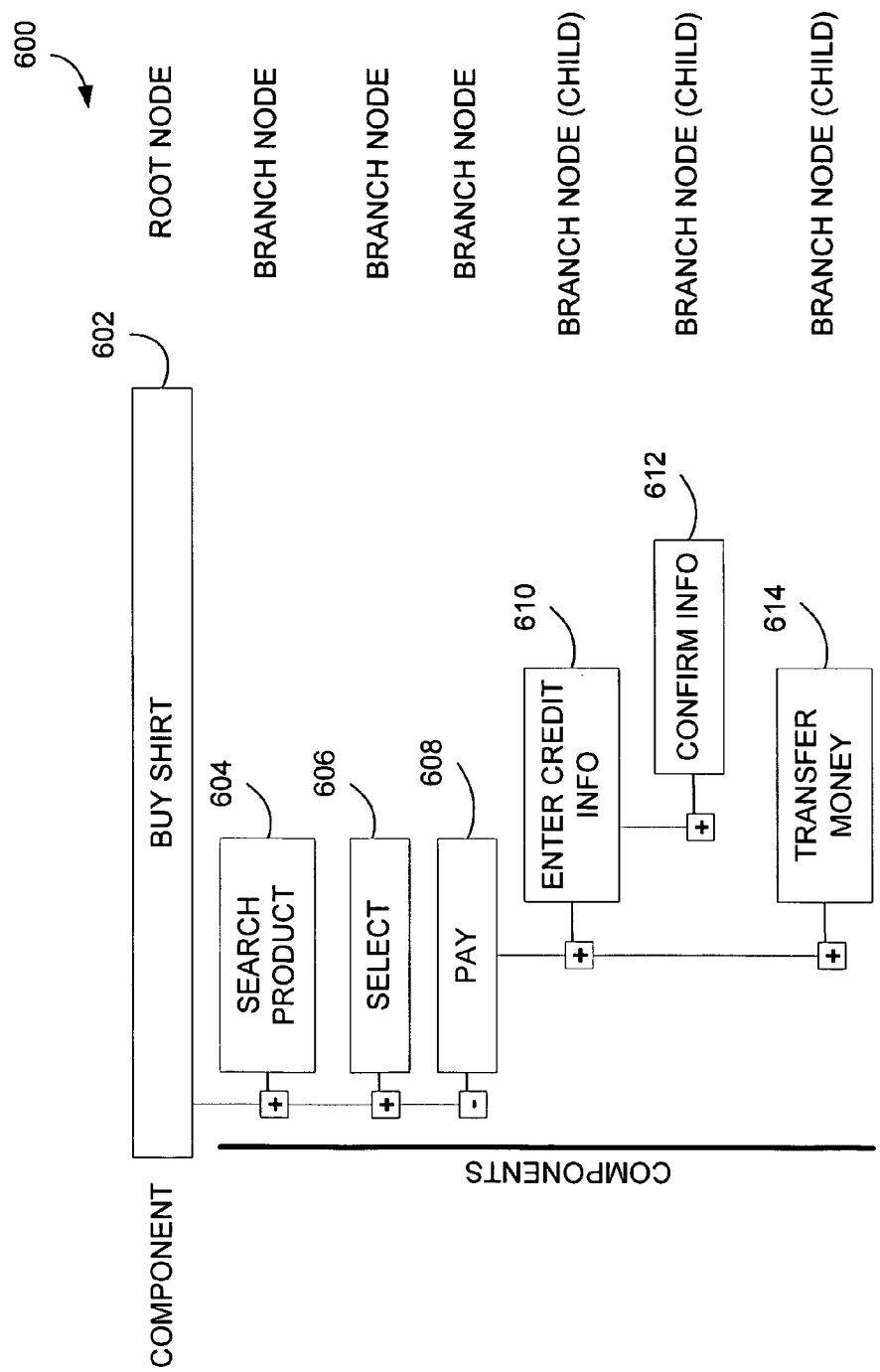
FIG. 8A illustrates a tree structure for component statistics reporting within an accounting infrastructure, according to an example embodiment.

FIG. 8A provides an example of an operation evaluated using accounting engine 320. A tree structure 600 illustrates the organization of the components and operations within component 602, as well as the relationship among these functions. The tree structure 600 includes nodes, which may identify an operation or component. Each node has an indication of its status as to branching. When a component includes other components, the component is a parent node. Similarly, components included within this component are children. Note, each function may be defined as a component in the component 602. When an operation is considered as a component, the operation may be a parent or a child as well. The tree structure 600 indicates a branch node of a parent by placing a "+" sign to the left of the component name. When the children are displayed, the "+" sign changes to a "−" sign. Alternate indicators may be used to identify relationships within a tree, wherein nesting and parent-child relationships are provided.

Continuing with FIG. 8A, one or more parameters are associated with at least one operation within component 602. Here, the component 602 is for an ecommerce transaction to purchase a shirt, labeled as BUY SHIRT. The component 602 is identified as a root node. The component 602 includes several operations, including a first operation to search product 604, which is a parent branch node. Other components include select 606, pay 608, enter credit info 610, confirm info 612, and transfer money 614. Other components are included but are not illustrated. As illustrated, execution of component 602 is in sequential order.

Figure 8B:
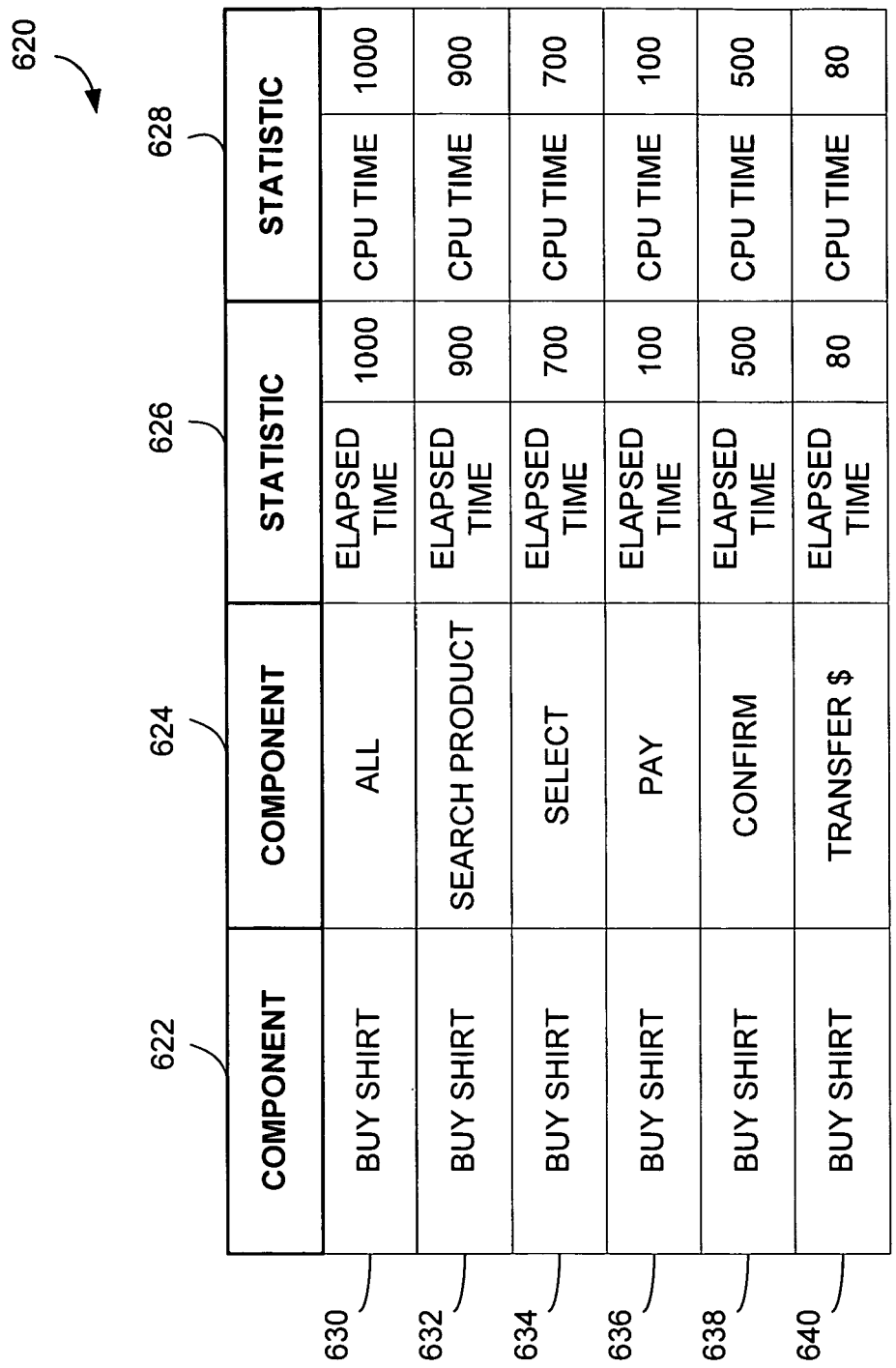
FIG. 8B illustrates an accounting report format generated by an accounting infrastructure for the components of FIG. 8A, according to an example embodiment.

FIG. 8B illustrates a table of accounting information compiled during execution of component 602, including columns 622-628. The column 622 identifies a component, which in this case is to BUY SHIRT. Column 624 identifies a component within the component of column 622. Columns 626 and 628 identify statistics measured. The table 620 includes a row for each measurement, including a first row 630 which lists the measurements and statistics are for components within the BUY SHIRT operation. The row 630 provides information for execution of the component 602, indicating, in this case, the elapsed time for execution of component 602 as well as the computing time. The component 602 is then further broken out by individual function or components in rows 632-640.

Various applications may interact with accounting infrastructure 198. The reporting structures may be predetermined according to the service, operation, measurement specifics, or may be customized by the user. Additionally, the reports may be output for use by other programs and services. Example formats for reporting are illustrated in FIGS. 9 and 10, wherein CPU resources, memory allocation, time for a function, procedure, component or operation, as well as date and time of update are reported.

As described herein, a method and apparatus for accounting infrastructure 198 is provided for evaluating performance of at least one operation of a service. Accounting infrastructure 198 allows identification and tracking of specific functions and components within a composite service offering, thus enabling optimization, troubleshooting, planning and design. Accounting infrastructure 198 may be implemented in an object-oriented programming model, where measurement details and specifics are provided in a tree structure to illustrate relationships among components, operations and services. The statistics provide detailed information on consumption of resources, and wherein components are measured over time. As described herein, according to one example embodiment, measurements are taken at a start and an end point. Other embodiments provide for periodic or random measurements. Still other embodiments allow for user-defined measurements, such as at a given point in an execution thread, or when two specific services are running concurrently. Additionally, measurement may be dynamically determined based on operation of the services. For example, it may be desirable to identify when a system slows down with relation to initiation of a given program or installation of a component.

In one embodiment, a composite service system 110, as in FIG. 1, and system 150, in FIG. 2, is a JavaScript® environment, by Sun Microsystems, Santa Clara, Calif. A composite service system is adapted to integrate multiple individual services, wherein a main deployment operation performs checks, validations, resolution, parallel evaluation, delivery and other functions per thread of a component. For example, the parameters specified for measurement may include execution time, processing time, memory usage, etc. The measurement may be made during deployment, during execution of individual components, during procedure call, or during execution of web services. The deployment operation is run at the initial start of each application. Additionally, during deployment operations, individual components and groups of components are deployed, updated, started, stopped, removed, and otherwise maintained. The composite service system is configured to process communications in a request/response protocol, wherein remote methods send requests for objects, processes, and methods. Measurements may be made during these operations as well. The methods may include de-serialization functions, lookups, method calls, deployments, etc.

The composite service system is further adapted to integrate web services, wherein a web container provides measurement points as well, including deployment operations, request-response protocol procedures, and during routing, such as according to a routing protocol. An example routing protocol is the Dynamic Source Routing (DSR), which provides routing protocol procedures for wireless mesh networks. Statistics may be integrated into the routing procedures, wherein the individual statistics may be aggregated to measure a parameter with respect to a communication path, such as according to a route or routes. Within each of these examples, various sub-operations may be measured down to the granularity desired by the user or the designer of accounting infrastructure 198.

To accumulate and list the various information resulting from implementation of accounting infrastructure 198, accounting infrastructure 198 keeps track of each parameter per component. This information may be stored in local memory or distributed per machine requesting or initiating a given service or component. The accumulation of information for each component allows evaluation of slow system startup, OOM conditions, or other poor performance during startup of a component or during operation.

Ideally, accounting infrastructure 198 is simple in design and easy to implement s as to allow easy integration and certainty of results. In one embodiment to provide a fast, streamline process, accessible to the various operations within the composite service system, accounting infrastructure 198 is a library on a low level in a Java stack, allowing access to each component. Accounting infrastructure 198 may be enabled or disabled and the specific parameters to measure may be specified by the user or the Java server. Accounting infrastructure 198 of one embodiment marks code in a main module with a start and an end point for each measurement, and assigns human readable string tags for each measurement. Measurements may be nested, resulting in a tree structure representation of operations, components and features. The use of an object representation of statistics provides an easy to read method for reporting, however, alternate embodiments may provide logged tables in traces for compatibility with other reporting tools. By providing statistics as objects, each object may be logged or converted to XML, as opposed to attempts to parse logs and try to create objects therefrom. Different methods of accounting and reporting may be desirable in a given application or environment.

In one embodiment, each measurement reports a list of measurement entries, wherein the number and type of entries depend on the set measurement type. Entries may be, for example, measured time, CPU usage, allocated memory, among others. When a nested measurement ends, each measurement's entry value is available for reporting at a data collection point in accounting infrastructure 198. By maintaining historical information, it is possible to evaluate trends and issues, which may not be obvious using snapshot or current value information. This makes it possible to identify how individual components consume resources.

FIG. 11 illustrates a report presented by an example API generated by reporting unit 155 of FIG. 2B. The API code is given as:

AIUtils.getInstance(    ).setStatisticType(AIStatisticType.CPU_AND_TIME);
public void startMeasure(String tagName);
public AIStatistic endMeasure(String tagName, Class clazz);

In this example, a user is able to initiate the accounting techniques of accounting infrastructure 198, and the resultant reporting is illustrated as in FIG. 11, wherein each statistic is identified according to a position in the execution thread. The example provides AIStatistic as an XML result. Tag-names are provided to evaluate statistics for each component. In this example, measured parameters include time of execution, computing usage, and allocated memory. The data collection point is identified as is the specific statistic tag-name. The report identifies families of components as well.

Figure 12:
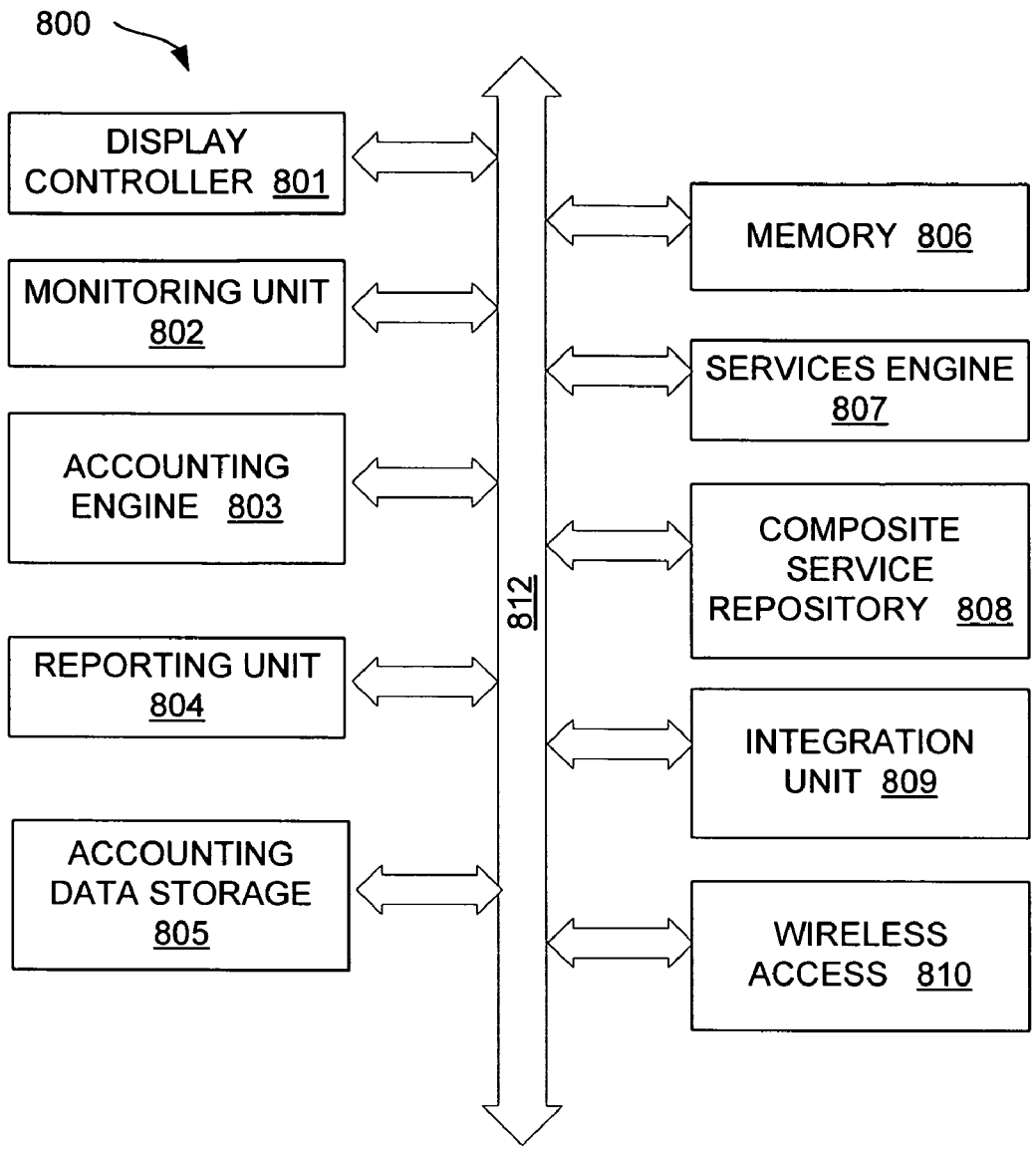
FIG. 12 is a diagram of a system implementing an accounting infrastructure for composite service, according to an example embodiment.

FIG. 12 illustrates a system for providing composite service and implementing accounting infrastructure 198. Communication within the system 800 is through communication bus 812. A display controller 801 acts as part of a user interface to provide data and control instructions for display of service information, as well as accounting reporting to the user. A services engine 807 provides instructions and data for execution of at least one service of a composite service. The composite service repository 808, in coordination with integration unit 809, implements functions to enable a composite service system, such as illustrated in FIGS. 2 and 3. Wireless access 810 provides communication with wireless devices and includes a transceiver (not shown). The system 800 further includes accounting engine 803, reporting unit 804, monitoring unit 802, and accounting data storage 805. The accounting engine 803 works with the services engine 807 to identify operations and components to measure, initiating such measurement and monitoring by monitoring unit 802. The measurements and statistics are provided to reporting unit 804 and accounting data storage 805. The reporting unit 804 provides output information to display controller 801, which is provided to client machines and modules for display for the user. The reporting unit and the accounting data storage also provide output information for use by other services or otherwise useful within a network. Communications may be transmitted by system 800 formatted to use an XML, a Macromedia-XML (MXML), ActionScript, JavaScript, Hyper Text Markup Language (HTML), or some other suitable format. The communications may be implemented by a physical or logical connections between accounting infrastructure 198 modules including the monitoring unit 802, accounting engine 803, reporting unit 804 and accounting data storage 805. The system 800 implements and generates objects and features, creates sets of object-related features, and filters the sets of object-related features for implementing accounting infrastructure 198. The blocks shown herein may be implemented in software, firmware, or hardware. The system 800, or any of the unit included therein, may be distributed to devices. Alternate systems may implement modules individually, or as a combination thereof.

Figure 13:
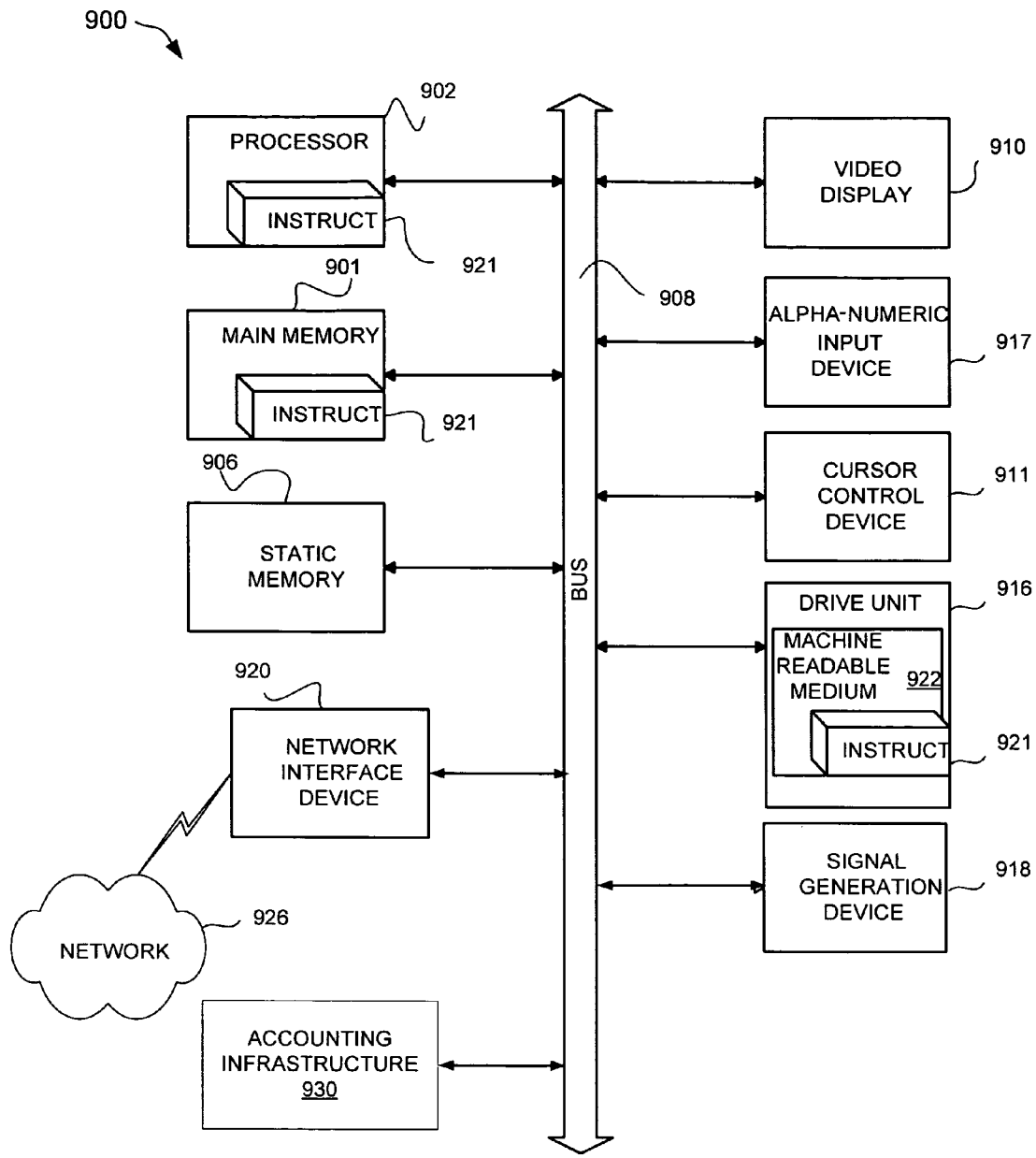
FIG. 13 is a diagram of a computer system implementing an accounting infrastructure for composite service, according to an example embodiment.

FIG. 13 illustrates a computer system 900 for implementing composite service and accounting infrastructure 198. The system 900 that executes a set of instructions to perform any one or more of the methodologies discussed herein. In alternative embodiments, the system 900 operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a Personal Computer (PC), a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description. In one embodiment, an accounting infrastructure is provided on individual client machines, wherein the accounting infrastructure at the client machine communicates with accounting infrastructure 198 in a central network accessible location. The client machine is then able to enable, disable, and provide specific instructions for monitoring components. Additionally, the client machine is able to display results to a user, illustrating resource consumption according to operation and component. The user is then able to modify or request modification to applications and services to more efficiently use resources, including balancing resources among multiple users.

The example computer system 900 includes a processor 902, a main memory 901, and a static memory 906, which communicate with each other via a bus 908. The computer system 900 may further include a video display unit 910 (e.g., a Liquid Crystal Display (LCD) or a Cathode Ray Tube (CRT)). The computer system 900 also includes an alphanumeric input device 917 (e.g., a keyboard), a User Interface (UI) cursor controller 911 (e.g., a mouse), a drive unit 916, a signal generation device 918 (e.g., a speaker) and a network interface device (e.g., a transmitter) 920.

The disk drive unit 916 includes a machine-readable medium 922 on which is stored one or more sets of instructions and data structures (e.g., software 921) embodying or used by any one or more of the methodologies or functions illustrated herein. The software instructions 921 may also reside, completely or at least partially, within the main memory 901 and/or within the processor 902 during execution thereof by the computer system 900, the main memory 901 and the processor 902 also constituting machine-readable media.

The instructions 921 may further be transmitted or received over a network 926 via the network interface device 920 using any one of a number of well-known transfer protocols (e.g., Hyper Text Transfer Protocol (HTTP), Secure Hyper Text Transfer Protocol (HTTPS)).

Accounting infrastructure module 930 is communicatively coupled to bus 908. The filtering module implements the filtering and subset generation discussed in the examples provided herein. Specifically, accounting infrastructure module 930 controls function of the accounting modules of FIG. 12, including accounting engine 803, monitoring unit 802, reporting unit 804 and accounting data storage 805, and works with the services engine 807 and the composite service repository 808.

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies illustrated herein. The term "non-transitory machine-readable medium" shall accordingly be taken to include, but not be limited to, solid-state memories, optical and magnetic media. In one embodiment, techniques may be implemented by transmissions on carrier wave signals.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "Software as a Service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions include, for example, instructions and data which cause a general purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. In case that the computer-executable instructions are transformed, a first computer may for example transform the computer-executable instructions into the executable format and a second computer may execute the transformed instructions.

One embodiment is described in a general context of method operations which may be implemented by a computer program product. The computer program product may include computer-executable instructions, such as program code, executed by computers in networked environments. Generally, program modules include for example routines, programs, objects, components, or data structures that perform particular tasks or implement particular abstract data types. Computer-executable instructions, associated data structures, and program modules represent examples of program code for executing operations of the methods disclosed herein. The particular sequence of such executable instructions or associated data structures represents examples of corresponding acts for implementing the functions described in such operations.

Embodiments of the invention may be operated in a networked environment using logical connections to one or more remote computers having processors. Logical connections may include for example a Local Area Network (LAN) and a Wide Area Network (WAN). The examples are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A system for monitoring services in a composite service, the system comprising a machine and a plurality of modules, each module comprising instructions that, when executed by the machine, perform identified operations, wherein the modules comprise:
    an accounting engine configured to monitor operation of a service in the composite service and to generate statistics for resource consumption of at least one component of the service within the composite service, wherein the statistics correspond to resource consumption of a system resource over time;
    a monitoring unit configured to monitor a parameter of the at least one component; and
    a reporting unit configured to receive the statistics from the accounting engine and to generate a presentation format for the statistics;
    wherein the monitoring unit comprises:
        a start measurement unit to take a first measurement of a first parameter at a first point marked in an execution thread for the at least one component; and
        an end measurement unit to take a second measurement of the first parameter at a second point marked in the execution thread,
    wherein the accounting engine is to determine a resource consumption measurement as a function of the first measurement and the second measurement, and
    wherein the reporting unit is to present the resource consumption measurement for the at least one component of the service.

2. The system as in claim 1, wherein the accounting engine instantiates a statistics object for the first parameter measured for the at least one component,
    wherein measurements of the first parameter for the at least one component are aggregated in the statistics object.

3. The system of claim 2, wherein the reporting unit is adapted to present the resource consumption measurement in a tree structure.

4. The system as in claim 2, wherein the at least one component is part of a family of components, and wherein the accounting engine is further adapted to aggregate resource consumption measurements for the family of components.

5. The system as in claim 4, wherein the reporting unit is further configured to generate a report including an aggregation of resource consumption measurements for multiple services.

6. The system as in claim 5, wherein the reporting unit is further adapted to generate a sequential report according to the execution thread, identifying resource consumption at each measurement point in the execution thread.

7. The system of claim 1, further comprising:
    a composite service unit configured to control and manage a plurality of services in a composite service; and
    an integration unit configured to integrate the plurality of services with the accounting unit and the reporting unit.

8. A method, comprising:
    initiating a first service in a composite service, wherein the first service includes a first component;
    measuring, using at least one processor, a first parameter of the first component on execution of the first service, the first parameter associated with resource consumption;
    generating statistics for resource consumption of the first component over time; and
    generating a report for the first service including the statistics for the first component, the report identifying resource consumption of the first component wherein execution of the first component has a corresponding execution thread, and
wherein measuring the first parameter comprises marking the execution thread to identify a measurement start for measuring the first parameter, and marking the execution thread to identify a measurement end for measuring the first parameter.

9. The method as in claim 8, further comprising:
upon execution of the first component, determining if measurement of the first parameter is enabled; and
generating statistics for the first parameter of the first component when measurement of the first parameter measurement is enabled.

10. The method as in claim 8, further comprising:
generating a tree structure for the report; and
determining a position in the tree structure for the statistics.

11. The method as in claim 8, wherein the reporting further comprises generating a report presenting the execution thread, the measurement start and the measurement end.

12. The method as in claim 8, wherein the reporting further comprises identifying errors in a component, and presenting error information as part of a report.

13. The method as in claim 8, wherein the first component is one of a family of components, and wherein aggregating consumption of resources by the first component comprises:
creating a first statistics object for the first parameter; and
aggregating measurements of the first parameter for all members of the family of components.

14. The method as in claim 8, wherein the first parameter is a measure of computing time measured from the measurement start to the measurement end.

15. The method as in claim 8, wherein the parameter is a measure of delay in delivery of information associated with the first component.

16. A non-transitory machine-readable storage medium embodying instructions which, when executed by a machine, cause the machine to perform operations comprising:
initiating execution of a service in a composite service, the composite service accessible in a distributed network of computing devices, the service having at least one component defined by a method and behaviour, wherein execution of the service has a corresponding execution thread;
measuring at least one parameter associated with the at least one component, the measuring beginning at a start measurement point marked in the execution thread, and the measuring ending at an end measurement point marked in the execution thread;
creating a statistics object for the at least one parameter;
relating the statistics object to another parameter; and
reporting the statistics object behaviour for the execution thread over time.

17. A non-transitory machine-readable storage medium embodying instructions which, when executed by a machine cause the machine to perform operations comprising:
measuring a parameter of at least one component of a service, the service part of a composite service, the at least one component comprising an execution thread;
generating statistics for resource consumption of at least one component of the service based on measurements of the parameter, wherein the statistics correspond to resource consumption of a system resource over time, the measurements of the parameter beginning at a start measurement mark in the execution thread, and ending at an end measurement mark in the execution thread; and
generating a presentation format for the statistics.

* * * * *